US012154519B2

(12) United States Patent
Eash et al.

(10) Patent No.: US 12,154,519 B2
(45) Date of Patent: Nov. 26, 2024

(54) MULTI-MODE DISPLAY

(71) Applicant: Avegant Corp., San Mateo, CA (US)

(72) Inventors: Aaron Matthew Eash, San Francisco, CA (US); Edward Chia Ning Tang, Menlo Park, CA (US); Warren Cornelius Welch, III, Foster City, CA (US); Christopher David Westra, San Carlos, CA (US); Rohit Prakash, San Jose, CA (US); William Tze-Tse Chien, Sunnyvale, CA (US)

(73) Assignee: Avegant Corp., San Mateo, CA (US)

( * ) Notice: Subject to any disclaimer, the term of this patent is extended or adjusted under 35 U.S.C. 154(b) by 0 days.

(21) Appl. No.: 18/295,835

(22) Filed: Apr. 4, 2023

(65) Prior Publication Data

US 2023/0317021 A1 Oct. 5, 2023

Related U.S. Application Data

(60) Provisional application No. 63/362,519, filed on Apr. 5, 2022.

(51) Int. Cl.
*G09G 3/34* (2006.01)

(52) U.S. Cl.
CPC ... *G09G 3/3406* (2013.01); *G09G 2300/0452* (2013.01); *G09G 2330/021* (2013.01); *G09G 2360/144* (2013.01)

(58) Field of Classification Search
CPC ......... G09G 3/3406; G09G 2300/0452; G09G 2330/21; G09G 2360/144
See application file for complete search history.

(56) References Cited

U.S. PATENT DOCUMENTS

| | | | | |
|---|---|---|---|---|
| 2008/0143970 | A1 | 6/2008 | Harbers et al. | |
| 2009/0009726 | A1 | 1/2009 | Kuan et al. | |
| 2010/0225640 | A1 | 9/2010 | Vieri et al. | |
| 2016/0188122 | A1* | 6/2016 | Capps | G03B 21/62 345/175 |
| 2018/0005590 | A1* | 1/2018 | Komanduri | F21V 7/0091 |
| 2018/0352626 | A1* | 12/2018 | Komanduri | G09G 3/32 |
| 2019/0206337 | A1* | 7/2019 | Jung | G09G 3/3406 |
| 2019/0206364 | A1* | 7/2019 | Jeong | G09G 3/2096 |
| 2019/0206894 | A1* | 7/2019 | Lee | G09G 3/20 |
| 2021/0195714 | A1* | 6/2021 | Woodgate | G09G 3/20 |
| 2021/0208357 | A1 | 7/2021 | Hwang et al. | |
| 2023/0127995 | A1* | 4/2023 | Tsuchida | G02B 26/0833 345/694 |

OTHER PUBLICATIONS

Chen, C.-C., et al., "Optical Design of LCOS Optical Engine and Optimization With Genetic Algorithm," Journal of Display Technology, vol. 5, No. 8, Aug. 2009, pp. 293-305.

(Continued)

*Primary Examiner* — Sejoon Ahn
(74) *Attorney, Agent, or Firm* — Nicholson De Vos Webster & Elliott LLP; Judith Szepesi

(57) ABSTRACT

A multi-mode display includes a mode selector to select one of a plurality of modes, each of the modes having a different light configuration, wherein one mode comprises a reduced color space mode, and one or more light sources controlled by the mode selector, the one or more light sources used to display content to a user with the multi-mode display.

20 Claims, 18 Drawing Sheets

(56) References Cited

OTHER PUBLICATIONS

International Search Report and Written Opinion, PCT App. No. PCT/US23/17496, Aug. 10, 2023, 17 pages.
Murat, H., et al., "Two LCOS Full Color Projector with Efficient LED Illumination Engine," Displays, vol. 30, No. 4-5, Dec. 2009, pp. 155-163.
Syndiant, Inc., SYL2271 Product Brief, High Resolution LCOS Light Modulation Panel, 2017, 2 pages.

* cited by examiner

MULTI-MODE DISPLAY

RELATED APPLICATION

The present invention claims priority to U.S. Provisional Application 63/362,519, filed on Apr. 5, 2022, and incorporates that application by reference in its entirety.

FIELD

The present invention relates to displays, and more particularly to an architecture for a multi-mode display in which illumination type is varied.

BACKGROUND

Color-sequential displays, typically spatial light modulators, have many advantages compared to traditional, emissive displays. Key advantages include high fill-factor per pixel and the ability to tightly control the illumination/emission angle of light from the display. However, a key disadvantage of color-sequential displays is a loss in brightness and optical efficiency as each color in the system is only on for a fraction of the total frame time.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
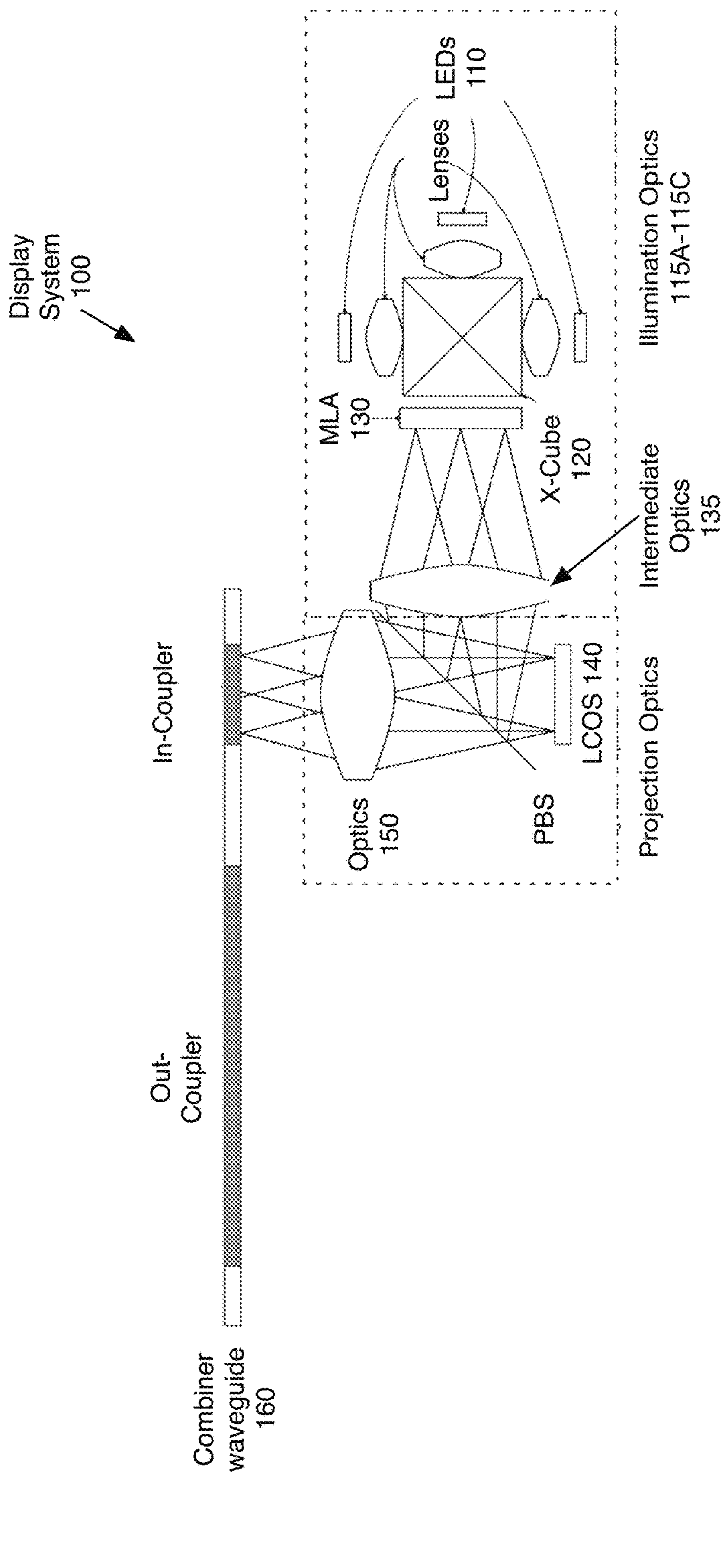
FIG. 1 illustrates one embodiment of one embodiment of a multi-mode LCOS-based display system.

A display that can operate in multiple modes is described. Each of the modes has a different light configuration, in which the light sources, their duty cycles, their power levels, and/or their combinations are varied. In one embodiment, the modes include a first mode with full color RGB and a second mode with a reduced color space (RCS). In one embodiment, the modes include a color sequential operating mode and a non-color-sequential (NCS) operating mode. In another embodiment, the modes include a full color RGB mode (which may or may not be color sequential) and a reduced color space mode (which may or may not be color sequential). The reduced color space mode sacrifices color (the user perceives less color space, or only a single color) but gains the advantages of increased brightness and/or lower system power consumption. RCS and NCS modes can be advantageous for many use cases, including in augmented reality (AR) head-mounted displays (HMD). Augmented reality HMDs may be worn outdoors, where the display brightness needs to be visible even in the presence of sunlight. By providing a multi-mode display we can provide a full color space when operating in the color sequential mode, and additional brightness and reduced power in the RCS mode. Thus, the system can be optimized for both use cases, without requiring separate displays. The multi-mode display can also provide optimized night-time display.

Reduced color space (RCS) mode is a mode where the display changes its light sources such that the color space that can be represented in a single image frame is reduced compared to a full color RGB mode. In full color RGB mode the color space can typically be represented by a triangle—with each of the red, green, and blue light sources representing a vertex of the triangle. In one embodiment, the RCS mode only displays a single color per image frame, in which case only a single point in a color space is represented per image frame. In another embodiment, the RCS mode displays 2 color frames per image frame, in which case the color space of the system becomes a 1-dimensional line.

In one embodiment, the RCS mode can change the colors selected in subsequent frames or series of frames. In one frame the color space of the system is a one-dimensional line, and in a subsequent frame, or series of frames, the color space of the system would be a different one-dimensional line. Drive current tuning may be used to provide such variances. This would enable an experience where a user would perceive one image that contains two colors, then a subsequent image that contains two different colors. This provides the advantages noted above, more brightness and reduced power. In one embodiment, these varying color selections are made based on the content being displayed. In another embodiment, the color selection is based on the environment.

The multi-mode display system enables on-the-fly changing of color sequences. In one embodiment, the system can be set to one of a plurality of pre-configured sequences, the sequences designed to address various internal and external factors. In one embodiment, a machine learning/artificial intelligence system is used to analyze the possible color sequences for display, and generate the settings for optimizing the color display. In one embodiment, color sequences may be optimized based on various factors including one or more of: battery use (efficiency), background, image frame content, ambient light levels, time of day, waveguide spectral response, temperature effects on the LEDs or other light sources, etc. In one embodiment, the system may prioritize these customization factors, based on user preference, system settings, and/or relevance. In another embodiment, the system may choose a pre-configured sequence or optimize a sequence based upon sensor inputs on the device, such as, but not limited to, light sensors, cameras, inertial measurement units, motion sensors, eye-tracking sensors, touch sensors, audio sensors, or user input via buttons or other mechanisms. Thus, the present system can provide a smart adjustment to provide a customized color mode display, where the mode may change based on a variety of factors.

In one embodiment, the present system utilizes a lighting array. The lighting array may be N×M array of LEDs. The use of an array enables sectional illumination of a spatial light modulator (SLM). This enables the different portions of the display to have different color sequences, in one embodiment. In one embodiment, a separate array is used for each color. In another embodiment, a single array may include all available colors. In one embodiment, the colors are RGB LEDs. In one embodiment, the colors include RGB and a fourth color, amber or white, as will be discussed below.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

FIG. 1 illustrates one embodiment of a multi-mode LCOS-based display system to display images, including still images and or moving images to a user. This is merely an exemplary embodiment, and the present system may be implemented in a variety of display systems that utilize a sequential color display. For example, the system may be implemented in a heads up display, a projection display, a head-mounted display (HMD), a virtual reality display, an augmented reality display, a heads up display, etc.

The display system 100 uses red, green, and blue light sources to display the subframes. The light sources in one embodiment are LEDs 110. Using red, green, and blue light sources 110 enables the recreation of a sufficiently wide color gamut, providing the user with a full-color display experience. In one embodiment, the light sources may be light emitting diodes (LEDs), lasers, microLED, organic LED (OLED), superluminescent diode (SLED), phosphors, or Quantum Dots. In one embodiment, the light sources may be segmented LEDs or an array of LEDs. In one embodiment, the spatial light modulator (SLM) can be liquid crystal on silicon (LCoS), Digital Light Processing (DLP), Digital Micromirror Device (DMD), or Liquid Crystal Display (LCD).

The light from these light sources pass through illumination optics 115A-115C, and in one embodiment are combined using a combiner, such as X-cube 120, or other optical elements. The combiner 120 used may differ, and may be a dichroic plate, holographic optical element, or any other type of combiner to ensure that the light from the different light sources 110 are correctly positioned. In one embodiment, the light passes through a micro-lens array 130, and intermediate optics 135. They are then reflected to a spatial light modulator (SLM) such as a liquid crystal on silicon (LCoS) 140. The modulated light is then passed through final optics 150, before being displayed to the user. In one embodiment, the output of final optics 150 is coupled into a combiner waveguide 160. The combiner waveguide 160 in one embodiment is used to display the image via glasses, goggles, or another mechanism.

Figure 2A:
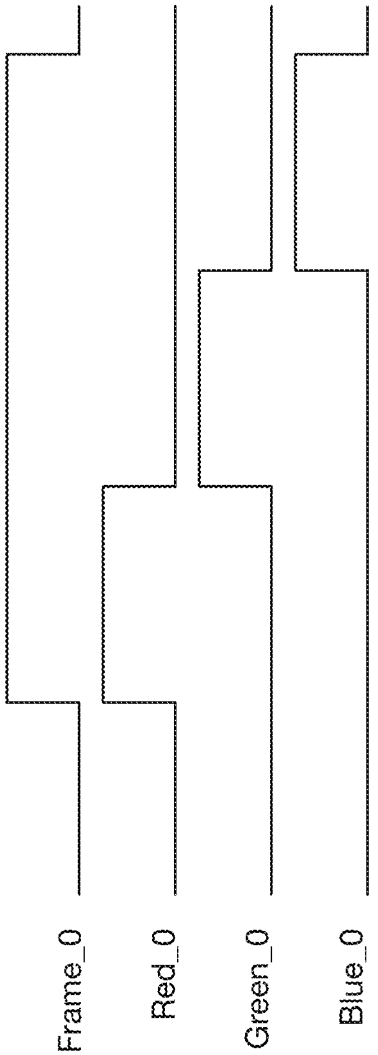
FIGS. 2A and 2B illustrate an exemplary light timing for two exemplary modes for a three light source system, showing a color sequential mode and a non-color-sequential mode.

Typically, such LCoS and DLP systems use a color-sequential display. In a color sequential display, the total brightness perceived by the user is a fractional sum of each color's duty cycle. A duty cycle is the percentage of a frame time that the particular color is on. If the system was running such that each color subframe was on for one third of the total frame time, the total system brightness would be a third compared to a system where all three colors were on simultaneously for the entire frame. FIG. 2A illustrates an exemplary color sequential display in which each of the red, green, and blue LEDs have a duty cycle of ⅓ of the frame.

Figure 2B:
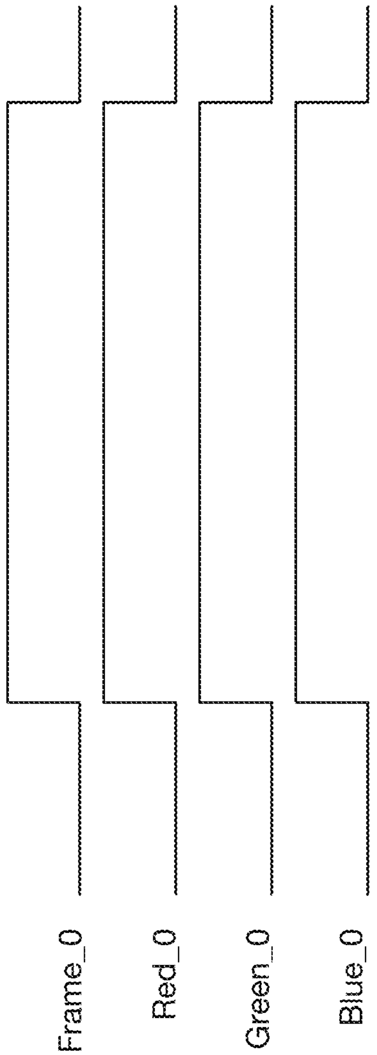

The present multi-mode system provides a solution for applications where the ability to adjust the color sequence and timing would be beneficial. One such application is in a situation where color-breadth (full color) is less important than brightness, power efficiency, and/or visual contrast. The multi-mode display may be operated with a different color sequence and timing, which in some embodiments is referred to as a reduced color space (RCS) mode. In a non-color-sequential mode, there is only a single color displayed per image frame. In one embodiment, in a non-color sequential mode one or more light sources may be enabled at the same time creating a single combined color. This enables tuning of the color displayed to the user by changing the relative drive intensity of each light source. In one embodiment, red, green, and blue light sources are enabled simultaneously, such that the user perceives a white color. FIG. 2B illustrates an exemplary non-color-sequential mode display, in which all three colors are on at the same time. In another embodiment, green and red are enabled simultaneously, such that the user perceives an amber or yellow color. Any other combinations of colors may be used.

In one embodiment, only a single color is displayed to the user for the full frame. In one embodiment, the single color is green, which provides the maximum photopic efficiency to the user's eye. In one embodiment, the single color is red, which may allow the user to preserve scotopic vision/night vision. In one embodiment, the user may select the color. In one embodiment, the color may be automatically selected based on various factors, including environmental and use conditions.

In another embodiment, the color timing may vary based on the multi-mode preferences. For example, a frame may consist of an RGBRGB sequence, in which each on-segment is $1/6^{th}$ of a frame. The frame may also be RG/BG, in which the red and green lights are on simultaneously, and then the blue and green lights are on in another segment. Furthermore, the duty cycle of the lights in combination may be less than the length of the frame. For example, the red, green, and blue lights may all be on for less than ⅓ of the full frame, such that during a portion of the frame no lights are on. The length that each light source is on may vary. As noted in the RG/BG example, in some cases one or more lights may be on for the full frame, and others for a portion of the frame.

Figure 3A:
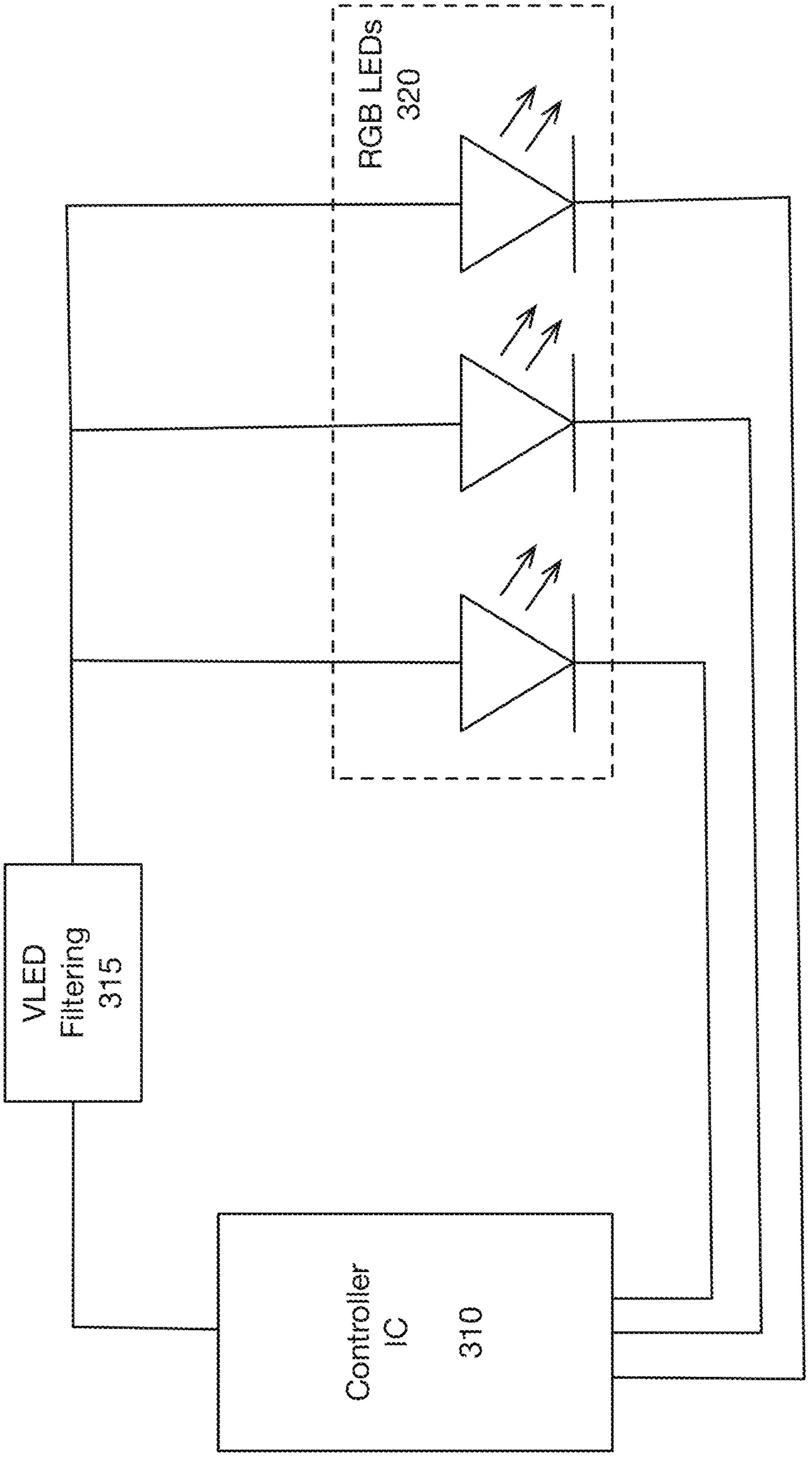
FIG. 3A is a diagram of one embodiment of the opto-electronic electronic drive configuration for a common anode three light source multi-mode display system.

In one embodiment, multi-mode is enabled by adjusting the drive architecture of the light sources. In a typical color-sequential display system, illustrated in FIG. 3A, the drive electronics for the light sources use a common anode drive architecture. The multi-mode display embodiment in which two or more colors can be enabled simultaneously utilizes an architecture that enables individual control of the light sources. Since different-colored light sources typically have different forward voltages, the drive architecture may need to simultaneously support multiple forward voltages. In one embodiment, this is achieved by using a single anode supply and varying the cathode voltage per color. FIG. 3A can be operated in a mode that enables this use case. While this approach can save space, it typically lacks efficiency as power is lost due to the low-side transistor of each color operating in a linear region to maintain the forward voltage of each color.

Figure 3B:
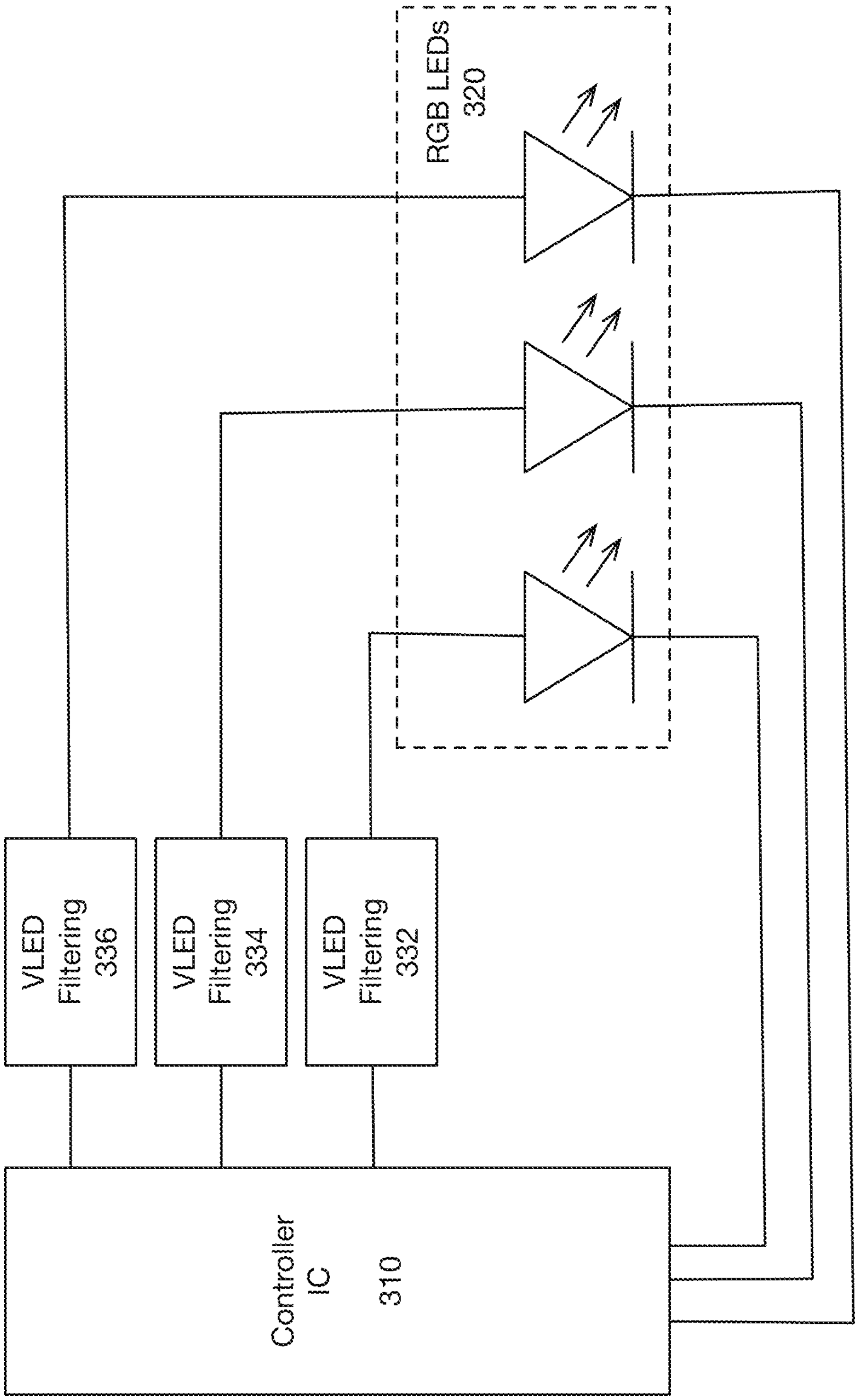
FIG. 3B is a diagram of one embodiment of the opto-electronic drive configuration for a discrete anode three light source multi-mode display system, using a single controller IC.
Figure 3C:
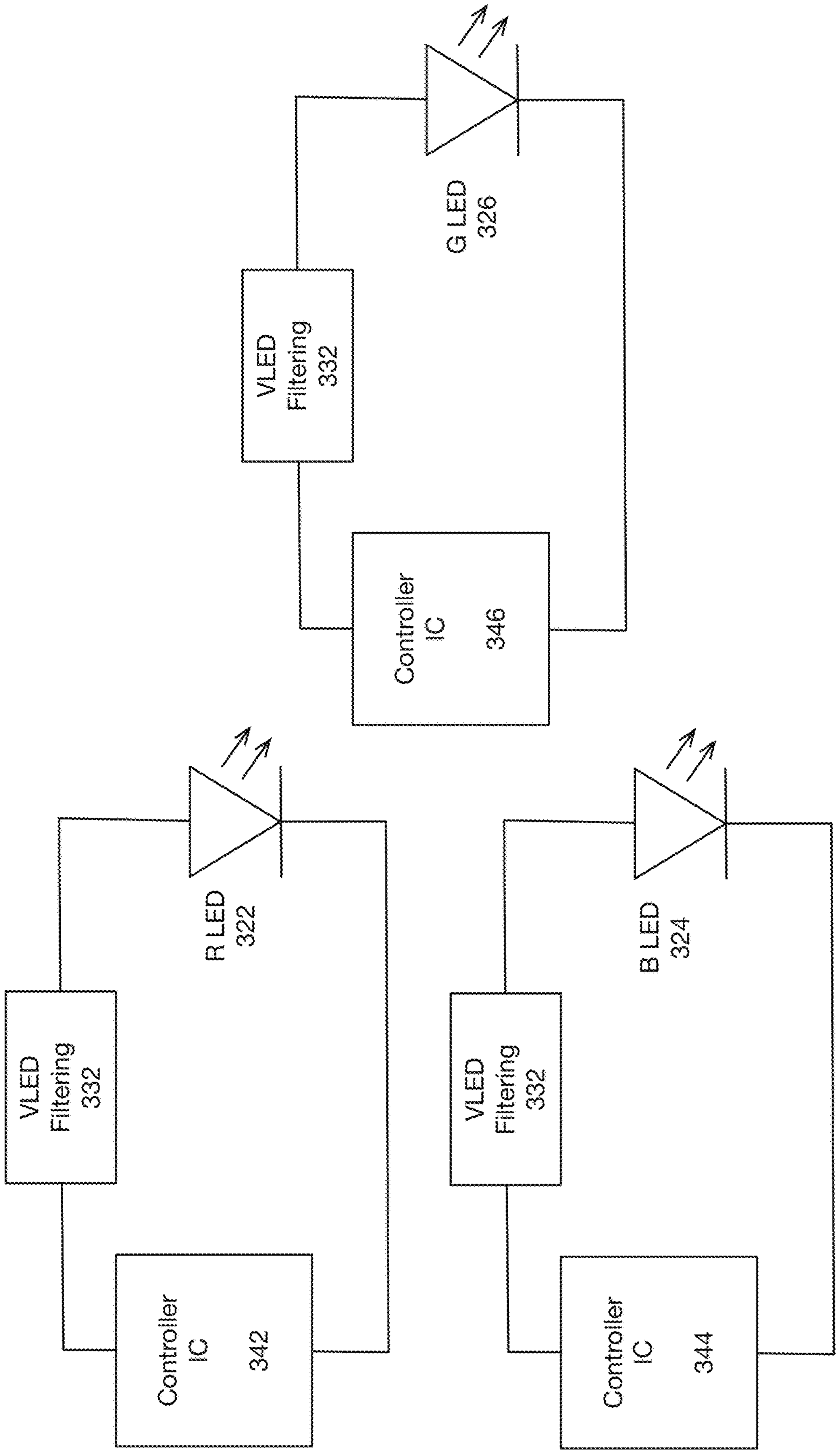
FIG. 3C is a diagram of one embodiment of the opto-electronic drive configuration for a discrete anode three light source multi-mode display system, using separate controller ICs for each light source.

In another embodiment, the system supports a separate anode voltage for each electro-optical light source, but uses a single controller IC. An exemplary illustration of this configuration is shown in FIG. 3B. This architecture may require more PCB space, as regulating multiple anode voltages requires filtering electronics per anode voltage line. However, having separate anode voltages typically enables a more efficient operation per color when operating in an RCS mode compared to a system where the low side drive transistor operates in a linear region. In another embodiment, the system supports separate anode voltages for each electro-optical light source and uses a separate control IC for each light source. An exemplary configuration of this is shown in FIG. 3C. In another embodiment, the light sources are designed to have sufficiently similar forward voltages, such that a single anode voltage may be used for all light sources, while also enabling each low side transistor to operate in either saturation, or a minimally linear region where little power is consumed by the linear operation of the transistor. This configuration is illustrated in FIG. 3A. In one embodiment, the sufficiently similar forward voltage per light source is achieved by using the same diode design to drive each color, and changing the emitted color of some diodes. In one embodiment, phosphor conversion may be used to change the diode color.

Figure 3D:
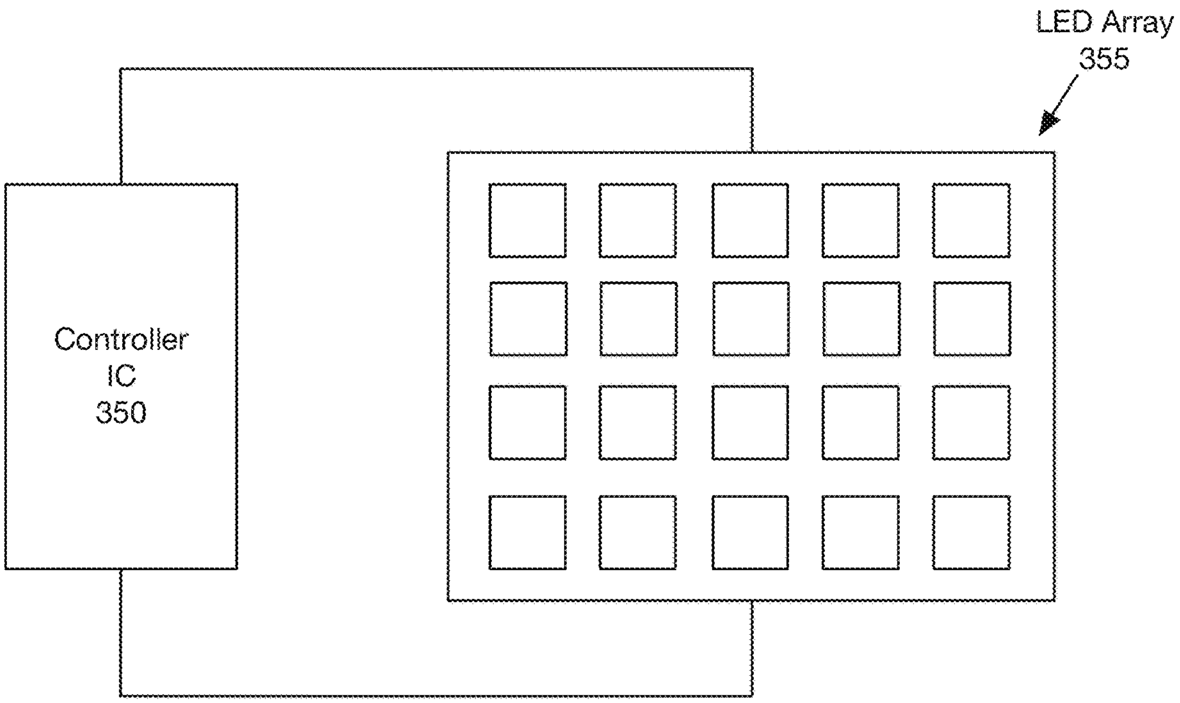
FIG. 3D is a diagram of one embodiment of the opto-electronic drive configuration for a light array based display system.

FIG. 3D illustrates an embodiment, in which the multi-mode system is supported by an LED array 355, which includes N×M LEDs. In one embodiment, the LED array 335 is all a single color, and there are three separate arrays, one per color. In one embodiment, when each LED array 355 is a single color, there may be three separate controller ICs 350 and associated LED arrays 355. In another embodiment, a single controller IC 350 may control two or more of the LED arrays 355. Any of the configurations illustrated above in FIGS. 3A-3C may be used with an LED array.

In one embodiment, rather than single color arrays, the LED array 355 includes multiple colors. In one embodiment, the same number of LEDs of each color are present in the array 355. In another embodiment, the number of LEDs of each color may vary. For example, there may be more green LEDs than blue or red LEDs. In one embodiment, the various colored LEDs are distributed to enable lighting of a portion of a display with all colors. In one embodiment, the LED array 355 is controlled by controller IC 350. In one embodiment, a multiplexer is used to address the individual LEDs in the array. In another embodiment, there may be a separate horizontal and vertical address controlled by separate portions of the controller IC 350. Other ways of controlling the individual LEDs within an array 355 may be used.

In one embodiment, the LED array may have a passive-matrix backplane. In another embodiment, the LED array may have an active matrix backplane.

Figure 4A:
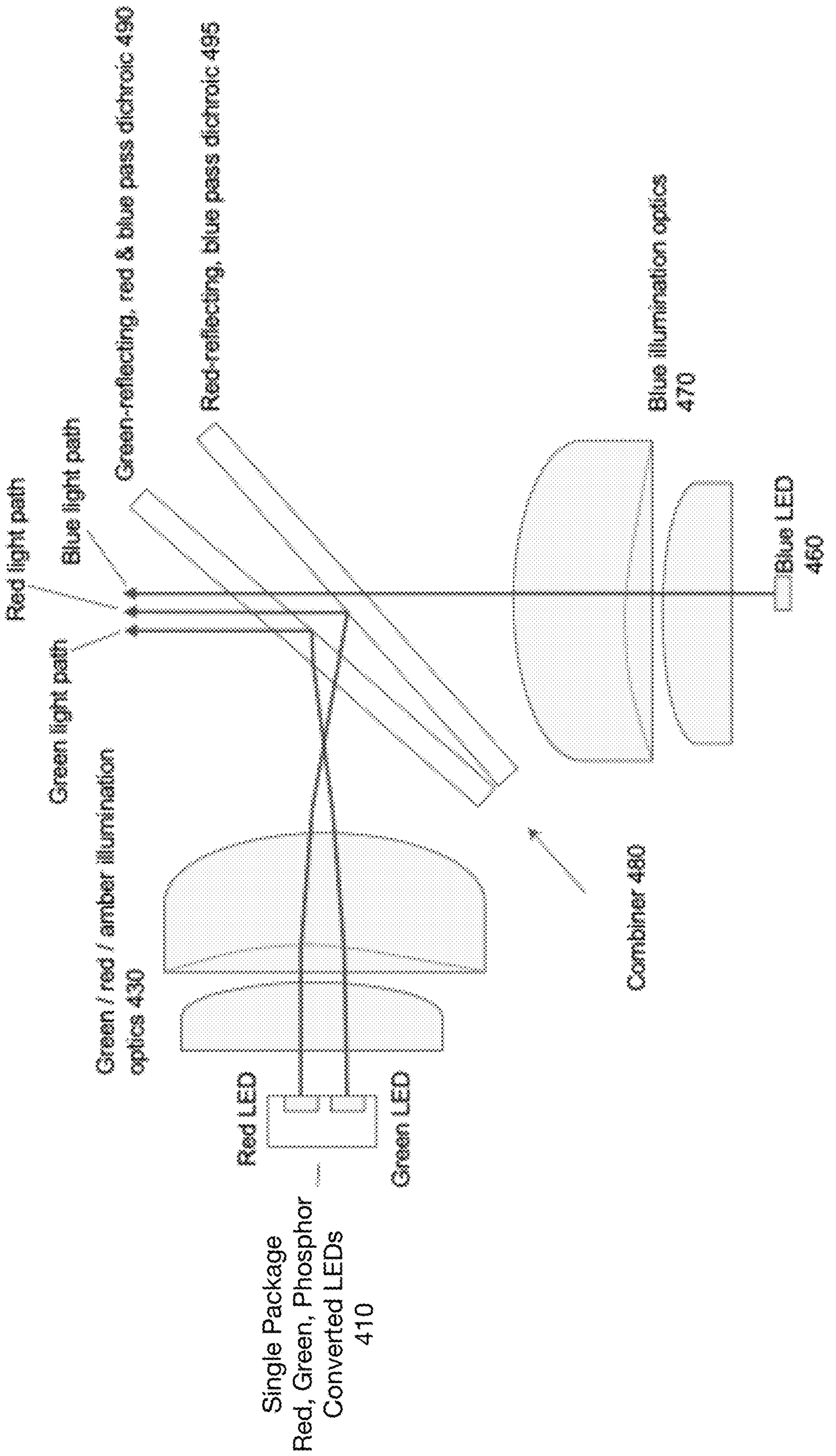
FIGS. 4A and 4B are diagrams of one embodiment of the optics configuration for a four light source multi-mode display system.
Figure 4B:
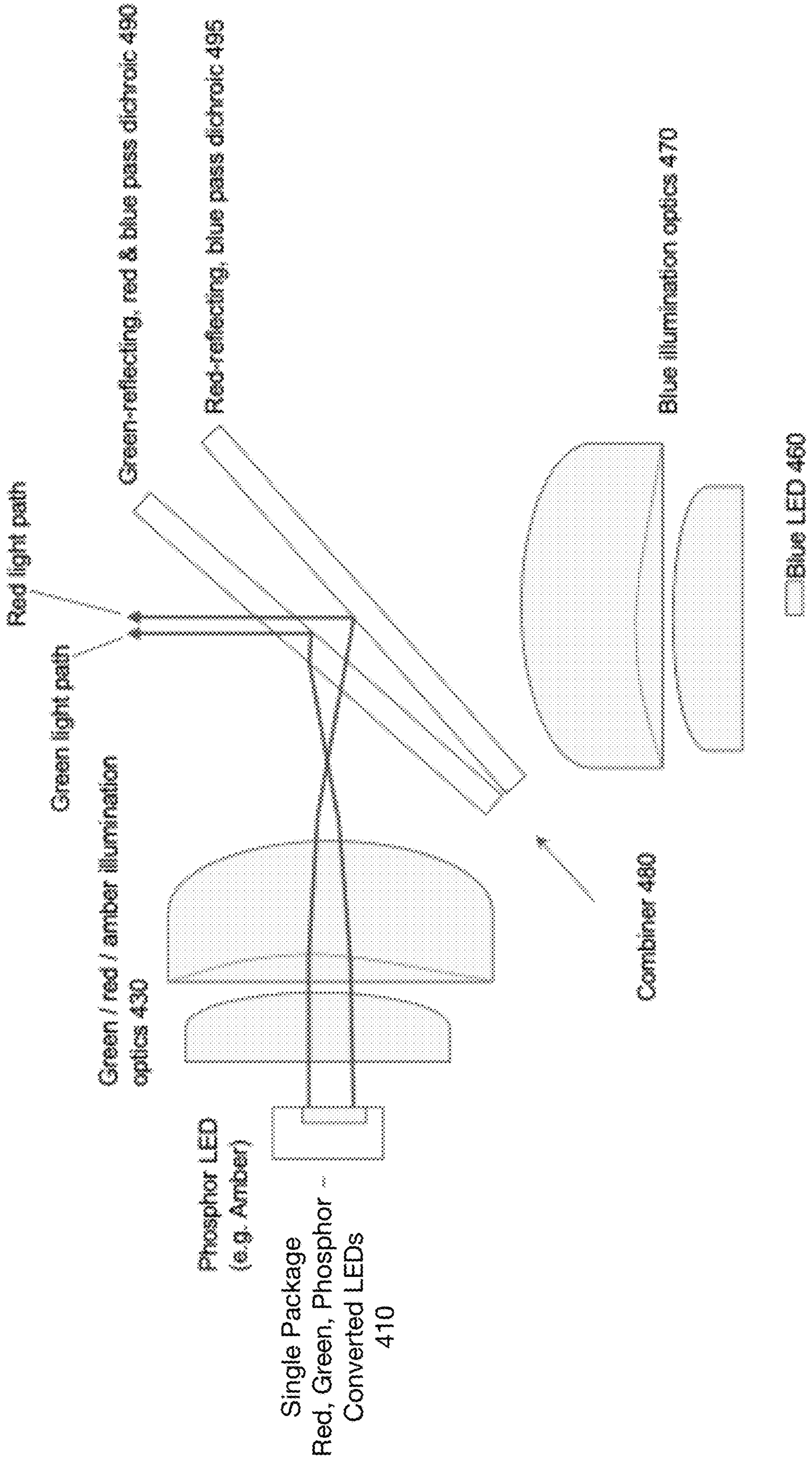

FIGS. 4A and 4B are diagrams of one embodiment of the optics configuration for a four light source multi-mode display system. The system illustrates an exemplary RGB light path in FIG. 4A, and an exemplary NCS illumination path.

As shown in FIG. 4A, in one embodiment, the system includes four LEDs in two LED packages 410, 460. The first LED package 410 includes the red, green, and amber LEDs. The second LED package 460 includes the blue LED. The LED packages used may vary, for example red/blue may be in one package, while green is in another package. Alternatively, one package may include red/green while the other includes blue/green. Other configurations may also be used. In one embodiment, the color combinations used depend on the use case. In one embodiment, the LED packages may be LED arrays, as will be discussed in more detail below.

The illumination optics 430, 470 include red/green/amber illumination optics 430 through which the light from the red/green/amber LED package 410 passes, and blue illumination optics 470, through which the blue LED 460 light passes. In one embodiment, the illumination optics may include a compound parabolic concentrator. Other types of optics may be used.

The lights are combined by combiner 480. Combiner 480 includes two dichroic plates 490, 495. The blue light passes through both plates toward projection optics (not shown), while the green light is reflected by one dichroic plate 490 toward the projection optics, and the red light is reflected by the other dichroic plate 495 toward projection optics. Although illustrated as positioned at a distance, in a real configuration the distance between the back of the green-reflecting plate 480 and the front of the red reflecting plate 495 is minimized. In one embodiment, the light that reflects off the plate closer to the red and green LEDs 410 reflects the light from the back, while the further plate reflects the light from the front, to minimize displacement. In one embodiment, the dichroic plates 490, 495 of combiner 480 may be steerable, to shift the angle when it is reflecting the red/green LED v. the phosphor-converted LED. In one embodiment, an actuator is used, and the dichroic plates 490, 495 are shifted between two positions. This has the advantage of better aligning the illumination pupils between full color and NCS modes.

The combiner 480 including dichroic plates, may be replaced by another type of combiner, for example an X-cube (also dichroic), or a combiner using refractive, dichroic, diffractive, freeform, catadioptric, metalens elements, or holographic optical elements.

FIG. 4B illustrates the path when the first LED package 410 uses the fourth light source, in this example an amber LED. The first LED package 410 includes the amber (or white) LED, which travels through the red/green/amber illumination optics 430, and is reflected by the green and red reflecting dichroic plates 490, 495.

This is merely an exemplary configuration of these elements. In another configuration, the fourth color light source may be separated. In another embodiment, the light sources may be coming from three separate locations, e.g., the fourth light source may have separate optics. Other optical configurations may be used. Although this illustration refers to "LEDs" each of the light sources may be an LED array. In another embodiment, a single LED array may provide multiple colors of light sources.

Figure 4C:
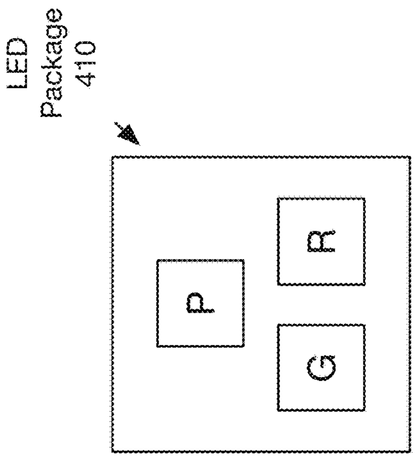
FIGS. 4C and 4D illustrate exemplary configurations of the multi-LED package.
Figure 4D:
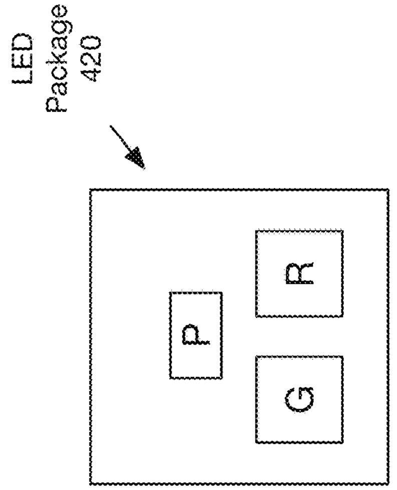

FIGS. 4C and 4D illustrate exemplary configurations of the multi-LED package. In this example layout, the green LED (G) and red LED (R) are side-by-side, with a phosphor converted fourth color LED (P) positioned toward the center, above the red and green. As shown in FIG. 4D, the phosphor converted fourth color LED (P) may be smaller than the green LED (G) and red LED (R). This configuration would have an RCS mode that has a smaller field of view than the RGB mode. This may be useful in some cases, for example in an AR display when information is displayed only on a portion of the screen.

In one embodiment, the fourth color is combined with the other colors using one or more polarization elements, such as, but not limited to, a liquid crystal rotator, a liquid crystal element, a polarized reflector, a geometric phase lens, a polarized beam splitter, and a waveplate. In one embodiment, the lights may be polarized such that the RGB lights have a first polarization, and the fourth light has an opposite polarization.

In one embodiment, the fourth color is combined with dichroic elements, such as, but not limited to, dichroic filters, dichroic combiners, and dichroic reflectors.

In one embodiment, the colors are combined and selected with a mechanical element such as, but not limited to, a moveable mirror, a moveable optic, a moveable filter, a shutter, a MEMS device, a deformable mirror, a tunable lens, or a moveable prism.

In one embodiment, the system has multiple inputs for illumination and multiple outputs, and the inputs and outputs correspond to one or more colors. In another embodiment, the multiple inputs/outputs are angularly selective.

In one embodiment, the illumination color combination uses one or more elements which may include any of the listed polarization, dichroic, mechanical and/or multiple elements, or other elements that may be used to combine illumination.

Figure 4E:
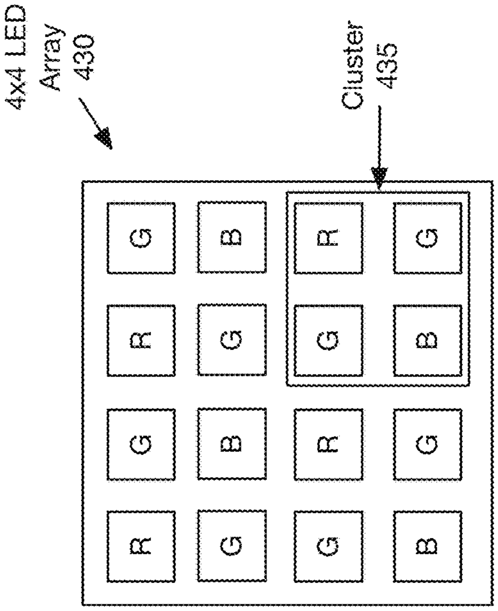
FIGS. 4E and 4F illustrate exemplary configurations of multi-color light arrays.

FIG. 4E illustrates one embodiment of an 4×4 LED array. The LED array 430 includes a plurality of LEDs of each color. In this example, there are four clusters 435 of four LEDs, in which one is red (R), one is blue (B), and two are green (G). However, this is merely an exemplary arrangement, in which colors are clustered with two greens. In another embodiment, the LED clusters 435 may instead include a fourth color, which may be white, yellow, or amber. Other ways of clustering lights may be used. In some embodiments, the shapes of the individual light sources may vary. Furthermore, not all colors need to have an equal area or shape. For example, because the human eye is most sensitive to green, in some embodiments the green light sources in the array 430 may be larger. Additionally, the layout of the array may vary.

Figure 4F:
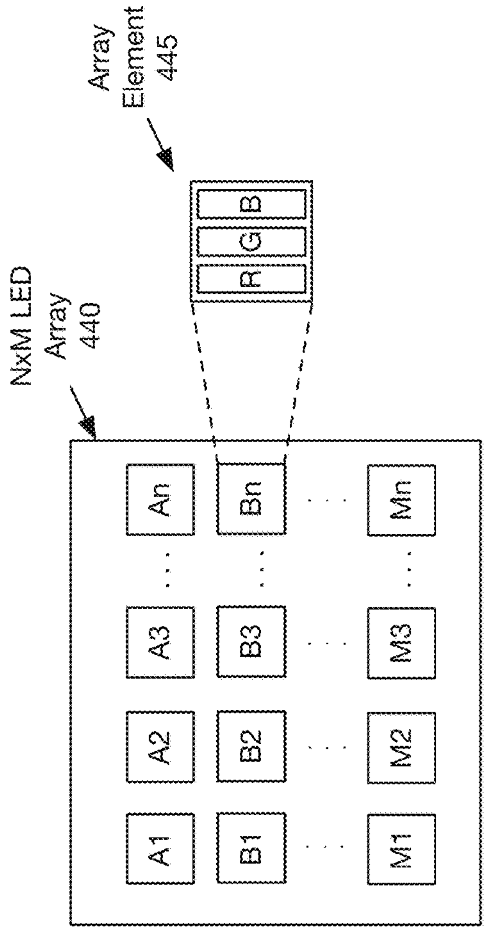

FIG. 4F illustrates an N×M LED array. The LED array 440 includes M rows of LEDs, and N LEDs per row. As noted above, the color arrangement may include one, two, three, or four colors in the array. In one embodiment, each LED represents an array element 445, with all three colors, RGB. Although the illustration shows the colors in each array element 445 as being the same size, the actual size of the color elements may vary by color and/or across the array.

In addition to arrays, the present application may use a segmented LED. A segmented LED is a single color LED having two or more segments which may be separately controlled. This may be used for example to light a portion of the display area with a particular color. This may be particularly useful for use cases where there is a region which consistently displays limited-color data. For example, for a heads-up display in which the bottom third of the display shows speed, temperature, and similar numerical data, having a segmented LED that can provide full color high color resolution images on the top ⅔ of the display while providing a reduced color display in the bottom ⅓ may be efficient. An array may also be used for this purpose. The segmented LED may be considered a 1×N array of a single color, in one embodiment.

Figure 5:
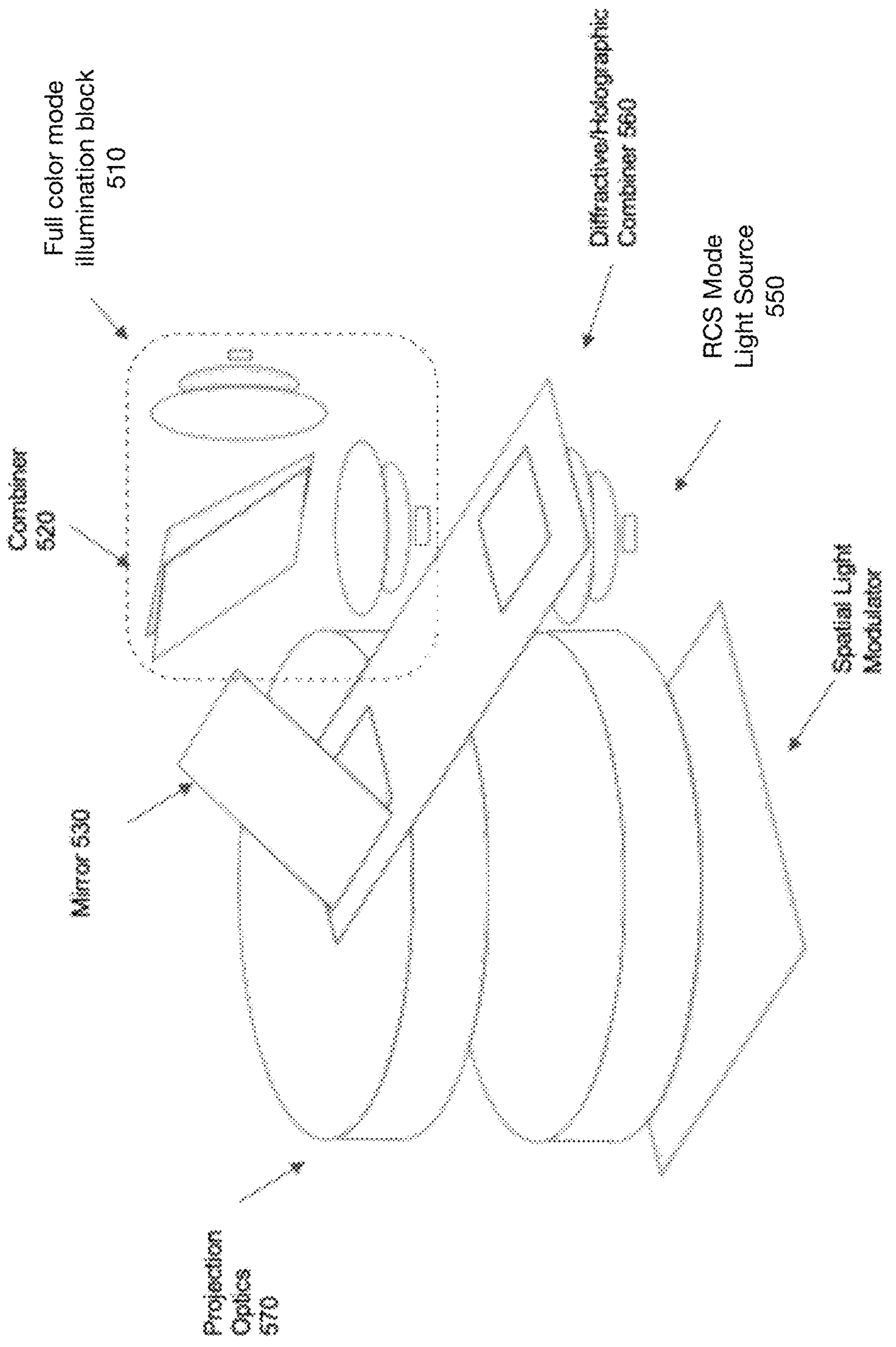
FIG. 5 is a perspective diagram of another embodiment of the optics configuration for a four light source multi-mode display system.

FIG. 5 is a perspective diagram of another embodiment of the optics configuration for a four light source multi-mode display system. In this configuration, the full color mode illumination block 510 is separate from the RCS mode illumination block. The full color mode illumination block 510 has light sources combined by combiner 520, reflected by mirror 530 toward projection optics 570. The RCS mode light source 550 passes through a diffractive/holographic combiner 560, which in one embodiment is a waveguide, on its way to the projection optics 570. The projection optics 570 are shared by the RCS mode light 550 and the full color mode lights.

Figure 6A:
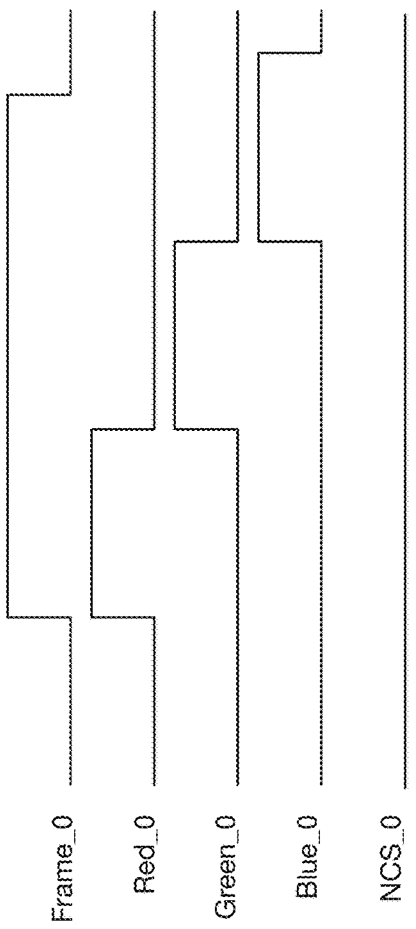
FIGS. 6A and 6B illustrate an exemplary light timing for two exemplary modes for a four light source system, showing a color sequential mode and a non-color-sequential mode.
Figure 6B:
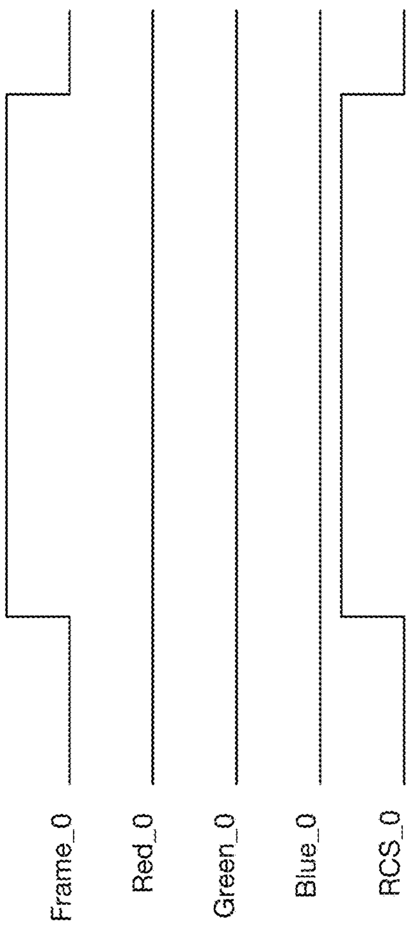

FIGS. 6A and 6B illustrate an exemplary light timing for two exemplary modes for a four light source system, showing a color sequential mode and a non-color-sequential mode. As can be seen, in FIG. 6A, the color sequential mode shows each color during ⅓ of the full frame. In contrast, for the non-color sequential mode, in one embodiment, the fourth LED (RCS_0) is on during the entirety of the frame. In another embodiment, the fourth LED is on during a portion of the frame. In one embodiment, there is some blanking time between frames. In another embodiment, all four LEDs are on simultaneously to maximize brightness out of the system.

Figure 7A:
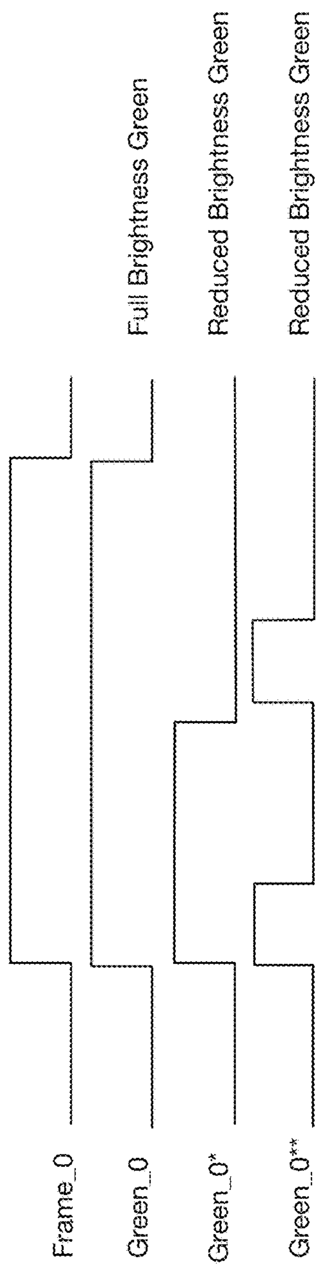
FIGS. 7A-7D illustrate some exemplary light timings for embodiments of various restricted light options.

FIGS. 7A-7D illustrate the light timing for embodiments of various restricted light configurations. FIG. 7A illustrates exemplary timing for a green-only display. In one embodiment, the green light source is on for the entire frame. as shown as Green_0, full brightness. In another embodiment, as shown in Green_0*, the green light source is on for 50% of the frame. This is referred to as an enhanced contrast mode. Because the LCOS takes some time to switch on/off, having blanking time between frames creates a more accurate recreation of the image, and provides higher contrast. Although a lower duty cycle may be used, a fully on system is more efficient because it typically allows for a lower drive current, which enables the LED to operate in a more efficient operating region. Alternatively, rather than having the green light source on for half the frame and off for the other, Green_0** illustrates a distributed green LED on-time, in which the green light is on for two pulses during a single frame. This may reduce flicker. Other pulsed schemes may be used. Although this is discussed with respect to green light, a similar pulsed lighting may be used for any of the colors. Additionally, this type of pulsed lighting may be used with a display including more than a single color.

Figure 7B:
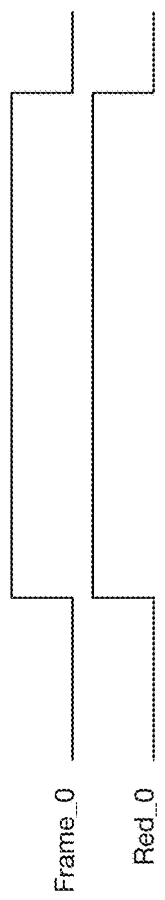

FIG. 7B illustrates exemplary timing for a red-only display. Although this is illustrated with the red light being on for the entire frame, one of skill in the art would understand that the red light may be lit for only part of the time.

Figure 7C:
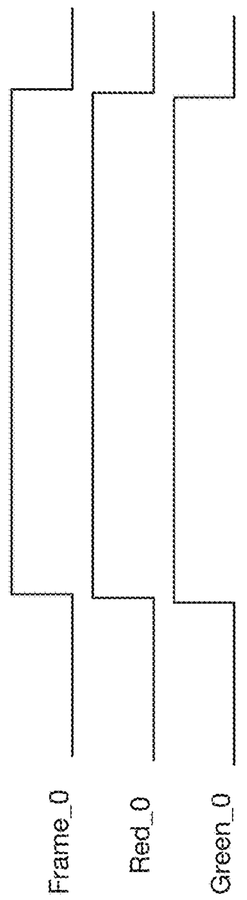
Figure 7D:
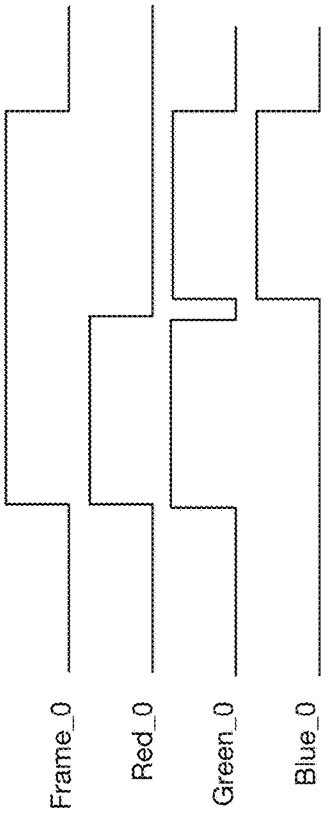

FIG. 7C illustrates exemplary timing for a red/green display. In one embodiment, the red and green LEDs are enabled simultaneously, and the drive current to each LED is varied to achieve a desired shade of amber. In one embodiment, the red and green LEDs are driven sequentially, and a combination of drive currents and duty cycle are used to achieve the desired shade of amber. In this embodiment, the content displayed can achieve any color between red and green. In another embodiment, the red and green LEDs may be enabled simultaneously for only a portion of the frame and allowing one of the colors to be on for a different duration. FIG. 7D illustrates exemplary timing for a display in which a first color sequence showing red and green simultaneously, is combined with a second color sequence that shows blue and green simultaneously.

Although the illustrations show various duty cycles for the different examples, it should be understood that any of the configurations may have any of the illustrated duty cycles. To maximize brightness, the duty cycle may be 100%. However, for example for battery savings, or when full brightness is not necessary, a reduced duty cycle may be used. Additionally, the frame rate may be varied for the different light configurations. In one embodiment, the frame rate for full spectrum display is 60 Hz (60 frames per second). In one embodiment, for the reduced color space options, the frame rate may be lowered or increased. In one embodiment, for a heads-up display, for example, the frame rate may be varied between 30 Hz and 360 Hz, or the highest framerate available for the spatial light modulator. In one embodiment, the variable frame rate may be used to display persistent information with a frame rate below 60 Hz. For example, for a clock showing hours and minutes, the frame rate may be reduced to one frame per minute, e.g., 0.016 Hz.

Figure 7E:
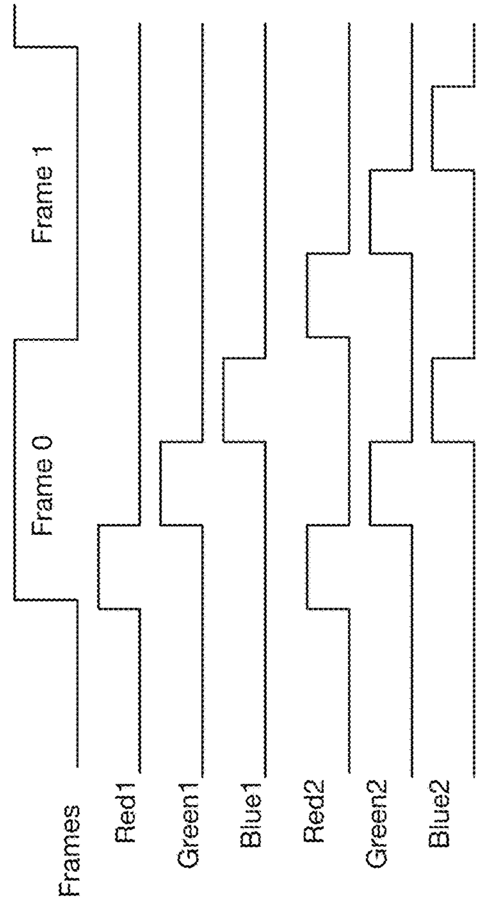
FIGS. 7E-7F illustrate some exemplary light timings for a light display with multiple red, blue, and green light sources.

FIG. 7E illustrates one embodiment of timing for an LED array in which there are two LEDs of each color. In this example, both sets of LEDS are illuminated sequentially for the first frame Frame0, but only the second set of LEDs is illuminated for the second frame, Frame0. In one embodiment, this may enable the second frame to illuminate only a portion of the display.

For example, if the system is outputting augmented reality images, and there is only content on a portion of the screen, this enables the system to save power, and still provide a high quality image in the portion of the frame that has data. This may also be useful for displaying something like closed captioning, road signs, or a persistent clock for a portion of the display. In one embodiment, the second half of the frame may only include a single color being displayed or a subset of colors.

Figure 7F:
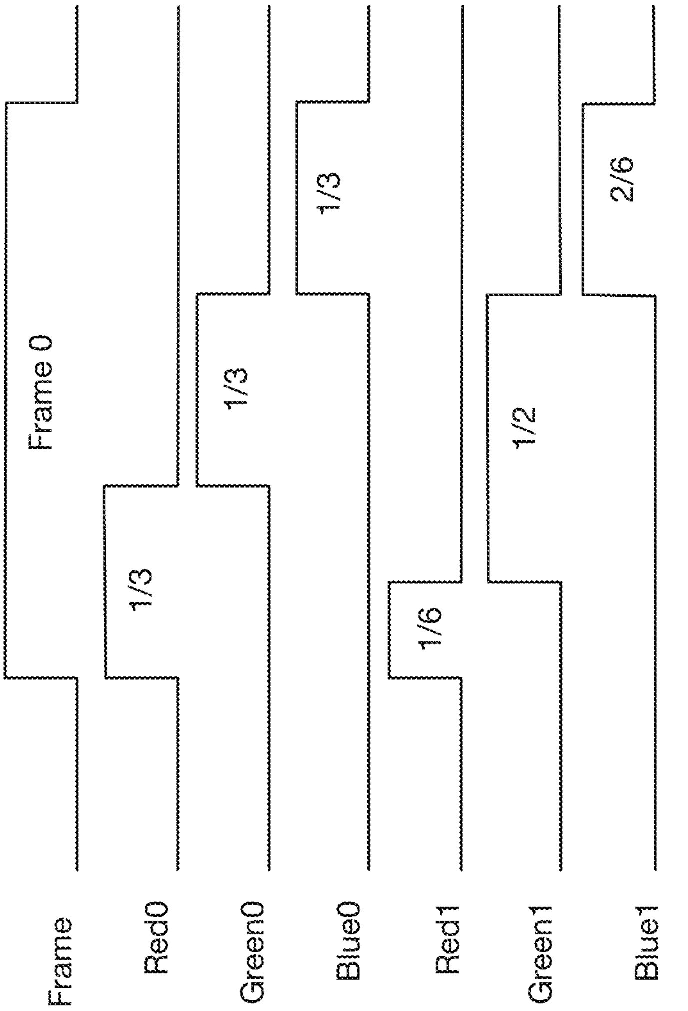

FIG. 7F illustrates one embodiment of timing for an LED array in which there are two LEDs of each color. In this example, during a single frame, a first set of RGB LEDs (Red0, Green0, and Blue0) are illuminated in sequence during the entirety of the frame. In this example, they are each illuminated for approximately one third of the frame, in color sequential fashion. The other set of LEDs, (Red1, Green1, and Blue1) are also illuminated in sequence for the entire frame, but some of the LEDs are illuminated for a longer period than others. In this example, the red LED is on for one sixth of the frame, the green LED is on for half of the frame, and the blue LED is illuminated for the remaining two sixth of the frame. Thus, the duty cycles may vary by color and by the portion of the display that is illuminated. In this instance, the display panel is synchronized with each illumination subsection. This is of course merely an example, and one of skill in the art would understand that the relative length of each LED on-time may be varied, and that there may be periods when none of the lights are illuminated.

Figure 8:
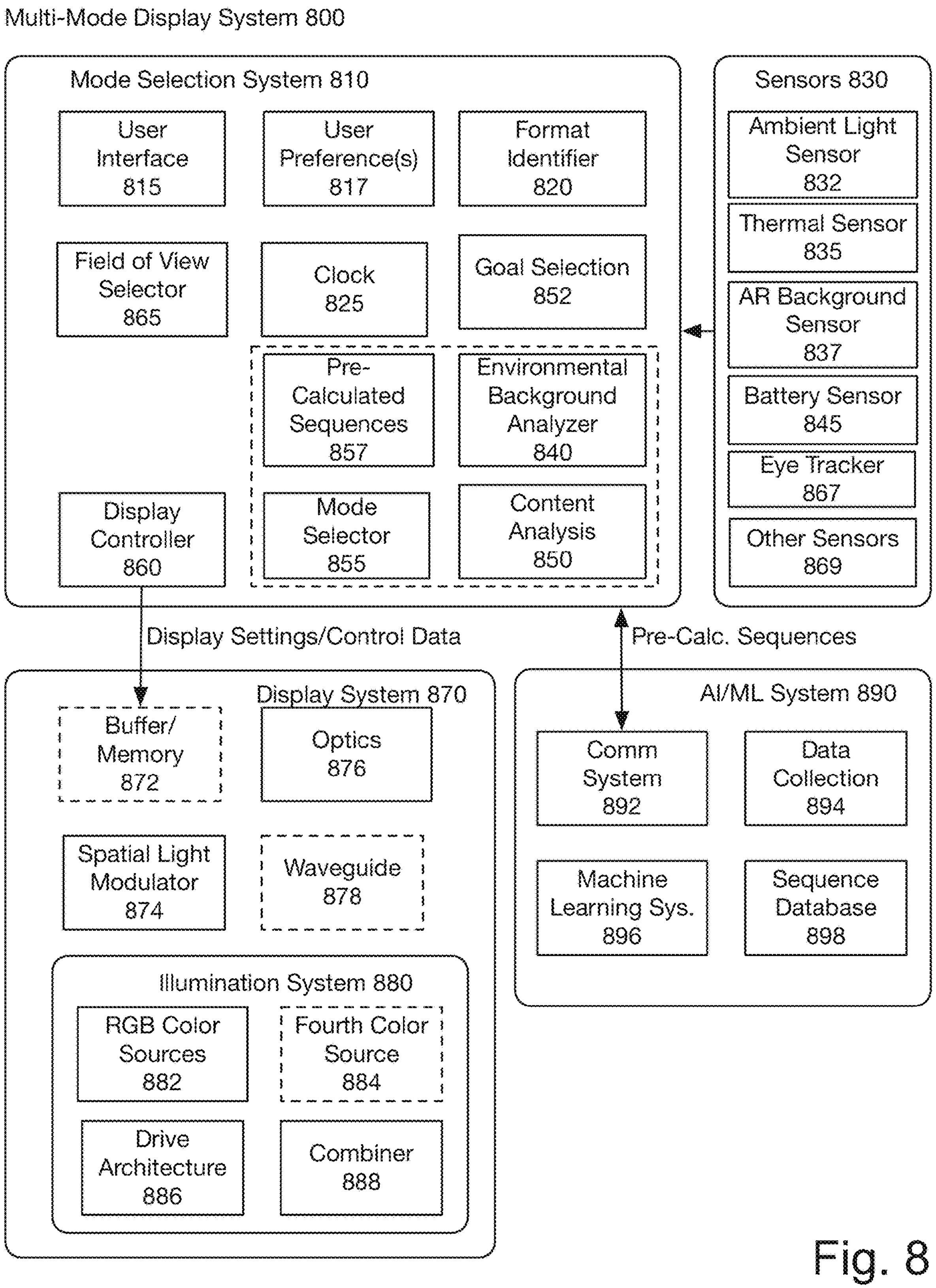
FIG. 8 is a block diagram of one embodiment of the multi-mode display system.

FIG. 8 is a block diagram of one embodiment of the multi-mode display system. The mode selection system 810 provides display settings to a display system 870, which utilizes the color sequences identified by the mode selection system 810 in displaying content. The mode selection system 810 in one embodiment utilizes data from sensors 830. In one embodiment, display settings may be specified on a frame-by-frame basis. In another embodiment, display settings may only be sent when they are changed from the current settings. In one embodiment, the mode selection system 810 receives precalculated color sequences from AI/ML system 890.

In one embodiment, the mode selection system 810 is implemented by a computer system, which includes a processor, and memory. The mode selection system 810 is in one embodiment a computer system which provides instructions to the display system 870. The processor(s) providing the functionality of the mode selection system 810 may be split across multiple devices. For example, some or all of the processing may be done on the glasses or other display system itself. Other portions of the processing may be done on a remote device. In one embodiment, the precalculated sequences 857, mode selector 855, environmental background analyzer 840, and content analysis 850 may be part of the display system 870. In one embodiment, one or more of the sensors 830 may be in the display system 870. The mode selection system 810 may not be a separate device from the display system 870.

The AI/ML system 890 includes one or more processors receiving data from the mode selection system 810 and providing data to the mode selection system 810. In one embodiment, the AI/ML system 890 may be a remote server. In one embodiment, the AI/ML system 890 may be implemented in the cloud, utilizing distributed processing and storage.

The display settings from mode selection system 810 are sent by display controller 860, based on a determination of one or more factors. As noted above, in one embodiment, one of the factors is a user preference received via user interface 815.

A particular mode may be automatically enabled by the mode selection system 810, in a display system based on use case or environmental conditions. In one embodiment, an ambient light sensor 832 is turned on when the system is in AR format or heads-up format, or another format in which the image data is displayed over other external data, as identified by display format identifier 820.

In one embodiment, the mode selection system 810 selects an RCS mode when the ambient light sensor 832 detects a high ambient light brightness. In one embodiment, the mode selection system 810 enables the RCS mode when a thermal sensor 835 in the system detects that the system is getting excessively warm, and that it should be run in a more power efficient mode. The thermal sensor 835 in one embodiment indicates when the temperature of the display system 870 or the processing system is above a threshold. In one embodiment, when the temperature is above a threshold, a reduced color display may be chosen to reduce power consumption. In one embodiment, when the temperature of the LEDs changes, the color space may be adjusted to correct for color drift due to temperature. In one embodiment, this may be detected based on data from thermal sensor 835. In one embodiment, a display sensor may be used to monitor output of the illumination system 880, and adjust for color drift based on the detected color spectrum v. the intended color spectrum.

In one embodiment, RCS mode is enabled when the environmental background analyzer 840 detects visual content that may be more advantageously shown in a monochrome or reduced color space format. In one embodiment, this visual content is text or reading-based applications, or a simple image, for example. In one embodiment, RCS mode is enabled when an ambient light sensor 832 detects low ambient light, and the clock 825 indicates that it is night. In one embodiment, when the clock indicates that it is night, the system may operate in a night mode that better preserves scotopic vision/night vision in the user. In one embodiment, this may include utilizing a red-only display. In one embodiment, RCS mode is enabled in a battery-powered system as a power-saving mechanism when low battery is detected by battery sensor 845. In one embodiment, a preference or goal may be set for a battery threshold below which the system is switched to the power saving mode. In one embodiment, if the display system is displaying a movie or other content with a known length, the system may switch to the reduced color space mode to ensure that the entirety of the movie or other content can be displayed with the battery power remaining.

In one embodiment, the sensors 830 also include an eye tracker 867 to determine where the user's gaze is looking. In one embodiment, the system may utilize a different color spectrum for the focal area and the peripheral areas of the user's gaze.

In one embodiment of an AR HMD, the system contains an outward facing AR background sensor 837 that images the same field of view as the display that is shown to the user. The environmental background analyzer 840 analyzes the background data, and the mode selection system 810 selectively enables a particular display mode in order to optimize the display for the background of the user's environment. In one embodiment, the optimization is designed to provide the highest possible contrast between the display and the environmental lighting and color conditions. For example, if the user's field of view that aligns with the AR display contains light that is predominantly red in color, the system could switch to an operating mode that uses more blue and green light, so as to provide a high contrast virtual image, compared to the red light that the user sees.

In one embodiment, field of view selector 865 selects the display field of view. In some embodiments, there may be an RCS mode that has a smaller field of view than the RGB mode.

The user may manually place a display system in a particular mode, using user interface 815. User interface 815 may be a button, dial, screen, voice interface, or another means to enable the user to select the display mode. In one embodiment, the user may place the system into a scotopic vision/night vision mode, in order to preserve night vision. In one embodiment the user may place the system in a night mode that reduces or completely eliminates blue light emission from the system. In one embodiment, the user may place the system in RCS mode because they are viewing content that is better represented in a monochrome format. In one embodiment, the user may select an RCS mode because they will be using the system in a high-brightness environment. In one embodiment, the user may place a battery-powered system in RCS mode as a power-saving mechanism to preserve or extend battery life. The user may also set general preferences via user interface 815. Such general preferences may be saved as user preferences 817. The preferences may be global, e.g., the user prefers high color fidelity v. lower power consumption, or time-based, e.g., at night the user prefers lower brightness and a warmer color tone with less blue light. Other preferences may be set by the user. The goal selection 852 may be based on a combination of the user preferences 817, and data from the sensors and image data from content analysis 850.

The color or combination of colors that are used for the selected display mode may be selected by mode selector 855, based on use case, user preference, content display, and/or environmental conditions. In one embodiment, the system may choose a pre-configured sequence or optimize a sequence based upon sensor data from sensors 830. In one embodiment, sensors 830 may be on the device. Sensors may include, but are not limited to, light sensors 832, eye tracking sensors 857, thermal sensors 835, user interface elements 815 such as touch sensors, audio sensors, or user input sensors of other types, as well as other sensors 869 such as cameras, inertial measurement units, motion sensors. The mode selector 855 selects the colors, color sequence, and timing. In one embodiment, the mode selector 855 utilizes one of a plurality of pre-calculated sequences 857. The precalculated sequences 857 in one embodiment are received from AI/ML system 890.

AI/ML system 890 in one embodiment is a remote server system which calculates potential sequences for use by mode selection system 810. In one embodiment, the AI/ML system 890 is an offline system that pre-calculates such modes for various lighting, environmental conditions, display content, and other factors. In one embodiment, the AI/ML system 890 utilizes a machine learning system 896 which receives data from data collection 894, with various potential sequences and available sensor data and calculated data. In one embodiment, the machine learning system 896 is initially trained with data from expert users classifying color quality and visibility in various scenarios, e.g., with various AR backgrounds and real world scene content. The trained machine learning system 896 can then be used to create pre-calculated sequences that are optimized for various scenarios. This data is passed to the mode selection system 810, in which the mode selector 855 can select a pre-calculated sequence 857, based on the data from the sensors 830, environmental background analyzer 840, and other data sources.

In one embodiment, a system with an ambient light sensor 832 detects a high brightness environment, and shows red, green, and blue simultaneously to provide high brightness white visual content to the user. In one embodiment, a system with an ambient light sensor 832 detects a low brightness environment and shows red only in RCS mode in order to preserve the user's scotopic/night vision. In one embodiment, a battery-powered display detects low battery 845, and shows green only in order to maximize photopic efficiency, and minimize power consumption such that battery life may be extended.

In one embodiment, a thermal sensor 835 in the system detects that the system is getting excessively warm, and RCS mode is enabled showing green only in order to maximize photopic efficiency, and minimize how much heat is further generated by the system. In one embodiment, green and red light sources are enabled in RCS mode to provide high photopic efficiency to the user while providing a more pleasing visual color versus a pure green.

In one embodiment, content analysis 850 analyzes the content of the images being displayed. In one embodiment, the system may optimize the color sequence based on the content being displayed. For example, if the content would be best displayed in monochrome, the system can adjust the color sequence to monochrome. In one embodiment, for a display with a light source array, a portion of the display may have a different color sequence than another portion of the display. For example, in a display with a persistent clock in one region, that area may utilize a different color scheme than the portion of the display that has images. Similarly, closed captioning may be displayed in monochrome, while the images above it are displayed with a full spectrum color image.

In one embodiment, the alternate operating mode has two color sequences, selected by mode selector 855. In one embodiment, the two color sequences are a red and a green color sequence. In one embodiment, the first color sequence shows red and green simultaneously, and the second color sequence shows blue and green simultaneously. In one embodiment the two colors selected may be changed on a per-frame basis. In that case, the user would see a first frame with two colors followed by a subsequent frame with two different colors. For such color switching, in one embodiment, the color selection is made based on the content.

These embodiments are by way of illustration, and not by way of limitation for a two color sequence. Operating with two color-sequences enables a non-monochrome display, while also enabling some of the advantages of a single-color mode (increased brightness and/or power efficiency).

The display system 870 includes a buffer/memory 872 to store the display settings from mode selection system 810. Display system further includes optics 876, a spatial light modulator 874, optionally a waveguide 878, and an illumination system 880. The illumination system 880 may have separate light sources 882, 884 for full color mode versus reduced color space mode. In one embodiment, full color mode uses red, green, and blue light sources 882, while RCS mode uses a white light source 884. In one embodiment, this white light source is a white LED.

In one embodiment, full color mode uses red, green, and blue light sources 882, while RCS mode uses a phosphor-converted green/amber LED 884 that is placed adjacent to the red and green LEDs in the illumination subsystem. In one embodiment, the RCS light source is combined using combiner 888. Combiner 888 may include reflective, refractive, dichroic, diffractive, or holographic optical elements. In one embodiment, combiner 888 enables the use of shared optics elements 876, between the RGB color sources 882 and the fourth color source 884.

In an illumination system 880 that uses dichroic plates as the combiner 892 to combine colors, this arrangement has the benefit of being able to efficiently use the same dichroic film combiners for both full color and RCS modes. In one embodiment, the spatial light modulator 874 may be LCoS, DLP or LCD.

In one embodiment, the RCS may use a different light source from full color modes' light source 882. The different light source 884 in one embodiment may have different illumination angles than the full color mode light source. In one embodiment, the RCS mode has a different field-of-view than the full color mode. In one embodiment, the light sources may be LEDs, lasers, microLED, OLED, SLED, phosphors, or Quantum Dots.

In one embodiment, the display system 870 has a LcoS spatial light modulator 874 and a polarized beam splitter as part of combiner 888. In another embodiment, the display system 870 has a LcoS spatial light modulator and non-polarized beam splitter as part of combiner 888. In one embodiment, the display system has a DLP spatial light modulator with a prism. In another embodiment, the display system has a DLP spatial light modulator with no prism.

In one embodiment, the display system uses different gamma tables for different types of sequences, including RCS sequences. In one embodiment, the system has a separate gamma table for red, green, and blue colors individually, and another gamma table for a mode where red, green, and blue are on simultaneously. These gamma tables may be custom tuned to get best contrast, best brightness, to compensate for thermal changes in the LED and panel, or according to some other system performance metric.

Figure 9:
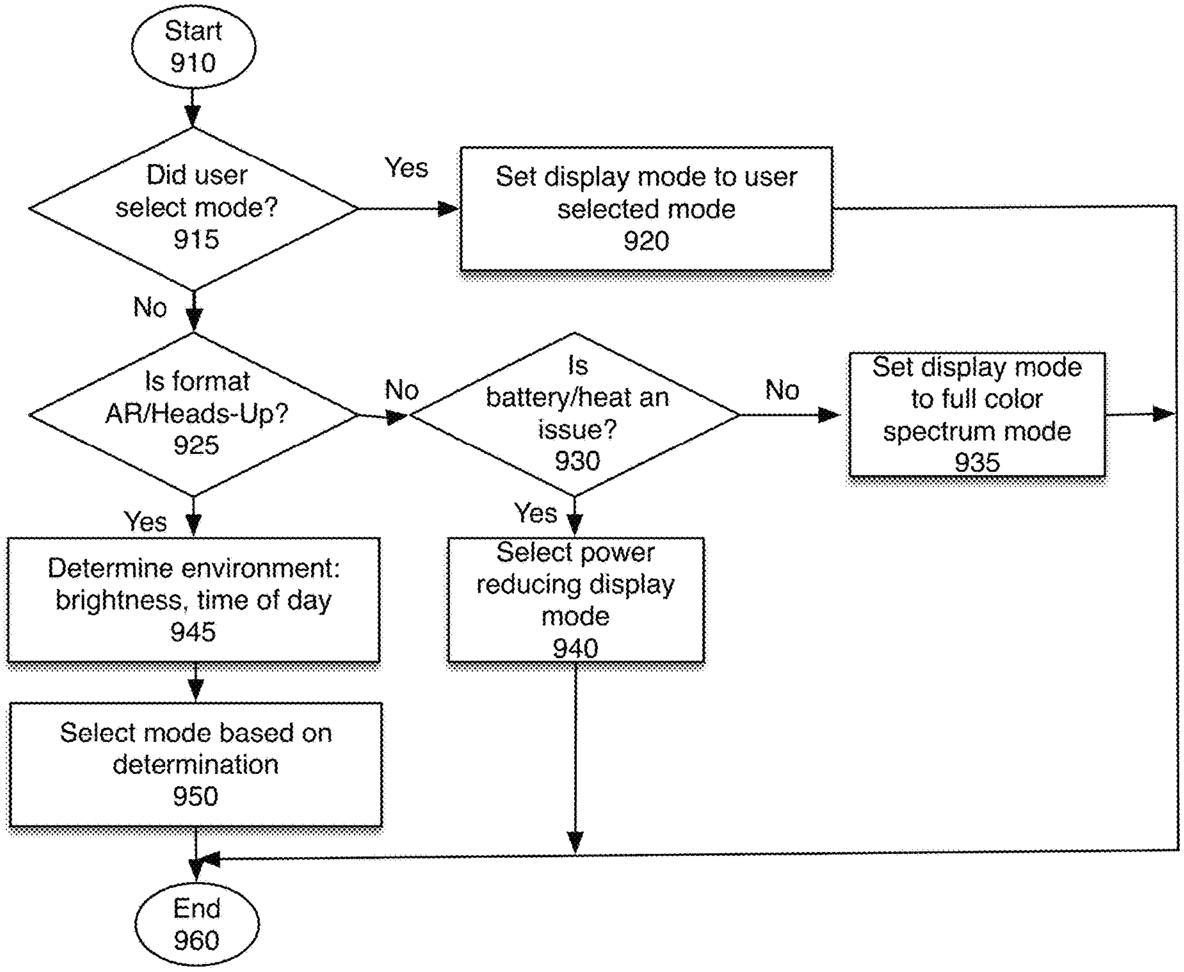
FIG. 9 is a flowchart of one embodiment of automatic mode-change triggering.

FIG. 9 is a flowchart of one embodiment of automatic mode-change triggering. The process starts at block 910. In one embodiment, the mode change may be on-the-fly, and the mode may change on a per-frame basis.

At block 915, the process determines whether the user selected a mode. In one embodiment, the user can manually select any mode, and override automatic mode selection. If the user selected the mode, at block 920 the display mode is set in accordance with the user's selection. In one embodiment, the display mode may include full color RGB display, and various reduced color space modes, which may be non-sequential or sequential.

If the user did not select a mode, at block 925 the system determines whether the system is being used in an AR/heads-up mode. If the system is not in AR/heads-up mode, at block 930 the process determines whether low battery or high heat is an issue. When there is low battery or high heat, at block 940 a display mode to reduce power is selected. In one embodiment, this may be a green-only display mode. Alternatively, another monochromatic or reduced color space display mode may be selected. If battery or heat is not an issue, at block 935, the full color space mode is selected. If AR mode was identified, at block 925, the process continues to block 945.

At block 945, the environmental factors are identified. These environmental factors may include for example brightness, time of day, color spectrum of the real world scene being viewed.

At block 950, the appropriate mode is selected based on the determination. The process then ends. As noted above, the user can override the automatic mode determination, in one embodiment. Furthermore, the user may, in one embodiment, trigger a reevaluation of the mode selected.

Figure 10:
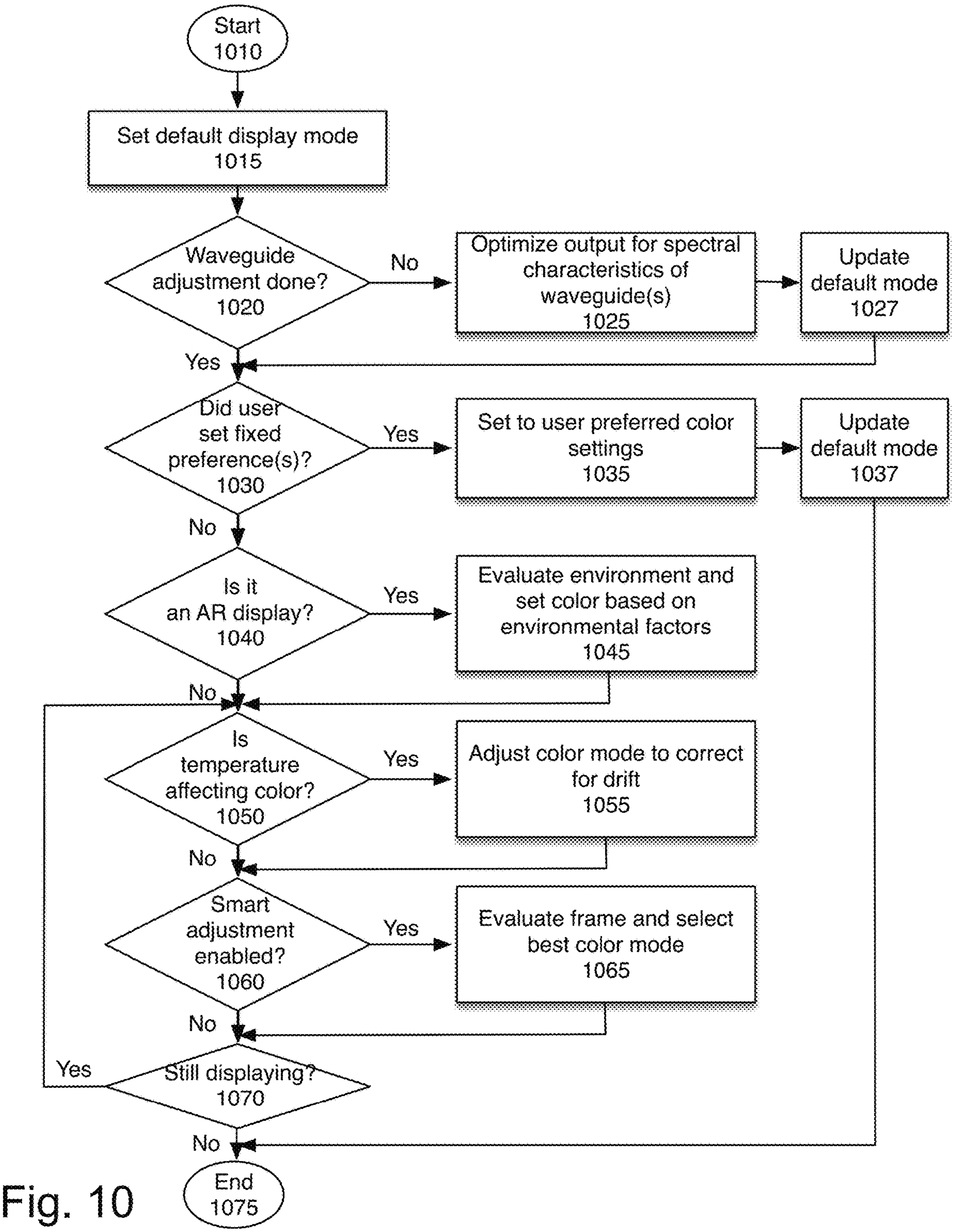
FIG. 10 is a flowchart of one embodiment of on-the-fly display optimization.

FIG. 10 is a flowchart of one embodiment of adjusting the color sequence based on various factors. The process starts at block 1010. At block 1015 the default display mode is selected. In one embodiment, the default display mode is a full color display.

At block 1020, the process determines whether a waveguide adjustment should be done. In one embodiment, the waveguide adjustment is done on initial configuration of the system. If the waveguide adjustment has not yet been done, at block 1025, the system adjusts the color display based on the spectral characteristics of the waveguide in the actual device. This enables color consistency across different waveguides. At block 1027, the default mode is updated based on the optimization. The process then continues to block 1030, to continue customization.

At block 1030, the process determines whether the user has set a fixed preference. If so, at block 1035, the user preferred color settings are applied. The process then updates the default mode, at block 1037. The process then ends, at block 1075, because the user's set preference overrides other configuration changes. If the user has not set a fixed preference, the process continues to block 1040 to continue adjustments.

At block 1040, the process determines whether the display is an augmented reality display. If so, at block 1045, evaluates the real world scene over which the display is being shown, and sets the color mode based on the environmental factors. The process then returns to block 1050. If the display is not an AR display the process continues directly to block 1050.

At block 1050, the process determines whether the temperature is affecting color. If so, at block 1055, evaluates the environment over which the display is being shown, and sets the color mode to adjust for the color drift due to temperature. The process then returns to block 1060. If the temperature is not impacting the display the process continues directly to block 1060.

At block 1060, the process determines whether smart adjustment is enabled. Smart adjustment is adjustment of the display color mode based on the content being displayed. In one embodiment, this color mode may be enabled by the user. If smart adjustment is enabled, the process continues to block 1065. At block 1065, the content of the image frame being displayed is evaluated, and the optimized color mode is selected for the frame. In one embodiment, as noted above, the optimized color frame is selected to enhance display quality. In one embodiment, other factors, such as battery level may be taken into account in choosing the display mode.

At block 1070, the process determines whether the system is still displaying. If so, the process returns to block 1050, to continue monitoring temperature and provide smart adjustment. In one embodiment, although only smart adjustment and temperature are shown here, other display factors discussed above would similarly be applied. Once the display is over, the process ends at block 1075.

Of course, though the above figures are illustrated as flowcharts, in one embodiment the order of operations is not constrained to the order illustrated, unless the processes are dependent on each other. Furthermore, in one embodiment the system may be implemented as an interrupt-driven system, and thus the system does not check for the occurrence, but rather the occurrence sends a notification to trigger actions.

Figure 11:
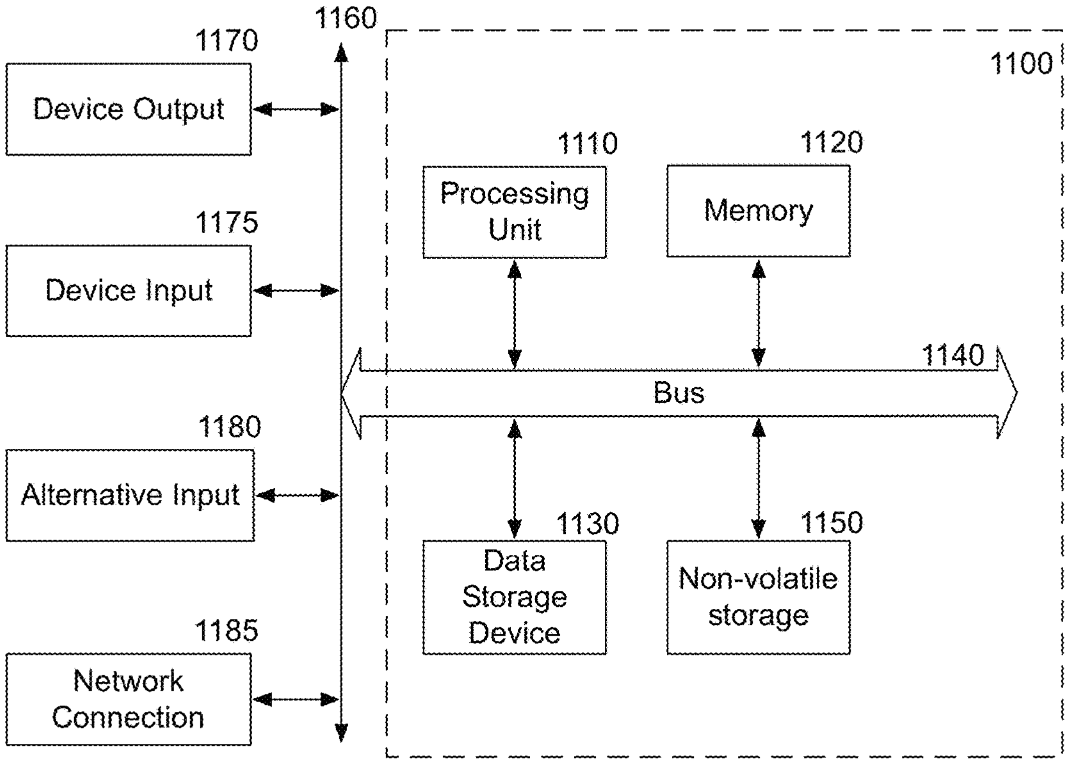
FIG. 11 is a block diagram of one embodiment of a computer system that may be used with the present application.

FIG. 11 is a block diagram of one embodiment of a specific purpose computer system. It will be apparent to those of ordinary skill in the art, however that other alternative systems of various system architectures may also be used. Furthermore, the present system may have certain features implemented using a distributed cloud system.

The computer system illustrated in FIG. 11 includes a bus or other internal communication means 1140 for communicating information, and a processing unit 1110 coupled to the bus 1140 for processing information. The processing unit 1110 may be a central processing unit (CPU), a digital signal processor (DSP), graphics processor (GPU), or any combination of the above elements or another type of processing units 1110.

The system further includes, in one embodiment, a memory 1120, which may be a random access memory (RAM) or other storage device 1120, coupled to bus 1140 for storing information and instructions to be executed by processor 1110. Memory 1120 may also be used for storing temporary variables or other intermediate information during execution of instructions by processing unit 1110. The system also comprises in one embodiment a read only memory (ROM) 1150 and/or static storage device 1150 coupled to bus 1140 for storing static information and instructions for processor 1110. In one embodiment, the system also includes a data storage device 1130 is coupled to bus 1140 for storing information and instructions.

In some embodiments, the system may further be coupled to an output device 1170, such as a computer screen, speaker, or other output mechanism. An input device 1175 may be coupled to the bus 1160. The input device 1175 may be an alphanumeric input device, such as a keyboard, a cursor control device 1180, a touch screen, or other input mechanism.

Another device, which may optionally be coupled to computer system 1100, is a network device 1185 for accessing other nodes of a distributed system via a network.

Note that any or all of the components of this system illustrated in FIG. 11 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1120, mass storage device 1130, or other storage medium locally or remotely accessible to processor 1110.

It will be apparent to those of ordinary skill in the art that the system, method, and process described herein can be implemented as software stored in main memory 1120 or read only memory 1150 and executed by processor 1110. This control logic or software may also be resident on an article of manufacture comprising a computer readable medium having computer readable program code embodied therein and being readable by the mass storage device 1130 and for causing the processor 1110 to operate in accordance with the methods and teachings herein.

The present invention may also be embodied in a special purpose appliance including a subset of the computer hardware components described above, such as a head-mounted display (HMD) or a heads-up display in a vehicle or other environment. For example, the appliance may include a processing unit 1110, a data storage device 1130, a bus 1140, and memory 1120, and no input/output mechanisms, or only rudimentary communications mechanisms, such as a small touchscreen that permits the user to communicate in a basic manner with the device. In general, the more special purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1185.

It will be appreciated by those of ordinary skill in the art that any configuration of the particular machine implemented as the computer system may be used according to the particular implementation. The control logic or software implementing the present invention can be stored on a machine-readable medium locally or remotely accessible to processor 1110. A machine-readable medium includes any mechanism for storing information in a form readable by a machine (e.g., a computer). In one embodiment, the control logic may be implemented as transmittable data, such as electrical, optical, acoustical, or other forms of propagated signals (e.g., carrier waves, infrared signals, digital signals, etc.).

Furthermore, the present system may be implemented on a distributed computing system, in one embodiment. In a distributed computing system, the processing may take place on one or more remote computer systems. The system may provide local processing using a computer system 1100, and further utilize one or more remote systems for storage and/or processing. In one embodiment, the present system may further utilize distributed computers. In one embodiment, the computer system 1100 may represent a client and/or server computer on which software is executed. Other configurations of the processing system executing the processes described herein may be utilized without departing from the scope of the disclosure.

In the foregoing specification, a mode selection system has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative rather than a restrictive sense.

We claim:

1. A multi-mode display comprising:

a mode selector to select one mode of a plurality of modes, each of the plurality of modes having a different light configuration, wherein a first mode is a color sequential mode, enabling red, green, and blue light sources in sequence during a frame, and a second mode is an alternative mode, and one of the plurality of modes comprises a reduced color space mode; and one or more light sources controlled by the mode selector, the one or more light sources used to display content to a user with the multi-mode display.

2. The multi-mode display of claim 1, wherein the mode selector comprises a user interface.

3. The multi-mode display of claim 1, wherein the mode selector comprises:

an ambient light sensor to determine ambient light level; and an environmental background analyzer to determine the light configuration based on the ambient light level.

4. The multi-mode display of claim 1, wherein the mode selector comprises:

a thermal sensor to determine a temperature of a display system; and the mode selector to select the reduced color space mode when the temperature is above a threshold.

5. The multi-mode display of claim 1, wherein the mode selector comprises:

a battery sensor to determine a power level for a battery powered display; and the mode selector to select a reduced color space when the power level is below a threshold.

6. The multi-mode display of claim 1, wherein the mode selector comprises:

a clock to determine a time of day; and the mode selector to select a color space to preserve scotopic vision.

7. The multi-mode display of claim 1, wherein the mode selector comprises:

a display data analyzer to determine a color of a real world scene over which an image will be displayed, and select the mode based on the color of the real world scene.

8. The multi-mode display of claim 1, wherein the alternative mode is a non-color sequential mode that comprises all three of the red, green, and blue light sources turned on concurrently to produce a white image.

9. The multi-mode display of claim 1, wherein the alternative mode is a non-color sequential mode which comprises using a fourth light source.

10. The multi-mode display of claim 1, wherein the alternative mode is a non-color sequential mode which comprises using one of the red, green, and blue light sources.

11. The multi-mode display of claim 1, wherein the alternative mode comprises a color sequential mode using a reduced set of colors.

12. The multi-mode display of claim 1, wherein a frame rate is different between the modes.

13. The multi-mode display of claim 1, wherein the mode is selected based on a content being presented.

14. The multi-mode display of claim 1, wherein the mode is selected on a per-frame basis.

15. The multi-mode display of claim 1, further comprising:

the one or more light sources comprising a light array including a plurality of LEDs, wherein the light array is configured to selectively illuminate a portion of a display, such that a first portion of the display has a different color spectrum than another portion of the display.

16. A multi-mode display for augmented reality, the multi-mode display comprising:

a mode selection system to select a color sequence, based on data from one or more sensors, wherein the color sequence includes a full spectrum display sequence and a reduced color space display sequence, wherein a first mode is a color sequential mode, enabling red, green, and blue light sources in sequence during a frame, and a second mode is an alternative mode;

an illumination source to provide a plurality of light sources, the illumination source controlled by an output of the mode selection system;

a combiner to combine light from the plurality of light sources;

a spatial light modulator to receive the combined light from the combiner, the spatial light modulator to modulate the light; and an output to output the modulated light to a user.

17. The multi-mode display of claim 16, wherein the one or more sensors comprise one or more of: an ambient light sensor, a thermal sensor, an augmented reality background sensor, and a battery sensor.

18. The multi-mode display of claim 16, wherein the mode is selected on a per-frame basis.

19. A method of providing a multi-mode display comprising:

selecting a display mode of a plurality of display modes, each of the display modes having a different light configuration, wherein a first mode is a color sequential mode, enabling red, green, and blue light sources in sequence during a frame, and a second mode is an alternative mode, and wherein one mode comprises a reduced color space mode; and controlling output of one or more light sources based on the selected display mode to display content to a user with the multi-mode display.

20. The method of claim 19, wherein the display mode is selected based on one or more of: an ambient light level, a temperature of a display system, a power level for a battery powered display, a clock to determine a time of day, and a color of a real world scene over which an image will be displayed.

* * * * *